(12) United States Patent
Wheatley et al.

(10) Patent No.: US 11,300,716 B2
(45) Date of Patent: Apr. 12, 2022

(54) RETROREFLECTING ARTICLE INCLUDING RETARDER

(71) Applicant: 3M INNOVATIVE PROPERTIES COMPANY, St. Paul, MN (US)

(72) Inventors: John A. Wheatley, Stillwater, MN (US); Michael A. McCoy, St. Paul, MN (US); Tien Yi T. H. Whiting, St. Paul, MN (US); Guanglei Du, Painted Post, NY (US); Neeraj Sharma, Lake Elmo, MN (US); Kui Chen-Ho, Woodbury, MN (US); Kenneth A. Epstein, St. Paul, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 316 days.

(21) Appl. No.: 16/486,313

(22) PCT Filed: Sep. 27, 2017

(86) PCT No.: PCT/US2017/053657
§ 371 (c)(1),
(2) Date: Aug. 15, 2019

(87) PCT Pub. No.: WO2018/151761
PCT Pub. Date: Aug. 23, 2018

(65) Prior Publication Data
US 2020/0003935 A1   Jan. 2, 2020

Related U.S. Application Data

(60) Provisional application No. 62/461,177, filed on Feb. 20, 2017.

(51) Int. Cl.
| G02B 5/30 | (2006.01) |
| G02B 27/28 | (2006.01) |
| G02B 5/124 | (2006.01) |

(52) U.S. Cl.
CPC .......... *G02B 5/124* (2013.01); *G02B 5/3016* (2013.01); *G02B 27/286* (2013.01)

(58) Field of Classification Search
None
See application file for complete search history.

(56) References Cited

U.S. PATENT DOCUMENTS 3,709,580 A   1/1973 Fugitt
3,758,193 A * 9/1973 Tung ............... G02B 5/128
                                              359/359

(Continued)

FOREIGN PATENT DOCUMENTS

DE   10 2009 007 124   8/2010
JP   H8-101304   4/1994

OTHER PUBLICATIONS

International Search Report for PCT International Application No. PCT/US2017/053657, dated Jun. 26, 2018, 3pgs.

*Primary Examiner* — Derek S. Chapel
(74) *Attorney, Agent, or Firm* — Michael Stern

(57) ABSTRACT

Retroreflecting articles are described. In particular, retroreflecting articles including a quarter wave retarder and a retroreflecting layer are described. The retarder is rotationally invariant and the retroreflecting layer is non-depolarizing. Such articles may be useful for sensor-detectable signs, labels, and garments.

22 Claims, 28 Drawing Sheets

(56) References Cited

U.S. PATENT DOCUMENTS

| | | |
|---|---|---|
| 4,361,911 A | 11/1982 | Buser |
| 4,847,488 A | 7/1989 | Muller |
| 6,010,223 A | 1/2000 | Gubela, Sr. |
| 6,153,128 A | 11/2000 | Lightle |
| 7,045,766 B2 | 5/2006 | Majima |
| 7,745,778 B1 | 6/2010 | Tharp et al. |
| 7,874,490 B2 | 1/2011 | Thomas, III |
| 8,113,434 B2 | 2/2012 | Thomas, III |
| 8,988,638 B2 | 3/2015 | Jiang |
| 2001/0012153 A1 | 8/2001 | Halter |
| 2002/0171935 A1 | 11/2002 | Cormack |
| 2002/0196542 A1 | 12/2002 | Nilsen |
| 2003/0193717 A1 | 10/2003 | Gubela, Sr. |
| 2005/0264822 A1 | 12/2005 | Bockman |
| 2005/0264823 A1 | 12/2005 | Zhu |
| 2008/0000976 A1 | 1/2008 | Thomas |
| 2009/0279903 A1 | 11/2009 | Roes et al. |
| 2010/0277801 A1 | 11/2010 | Nakajima |
| 2012/0300166 A1 | 11/2012 | Jiang |
| 2014/0240582 A1 | 8/2014 | Hasegawa |
| 2019/0137669 A1* | 5/2019 | Wheatley ............... G02B 5/281 |

\* cited by examiner

RETROREFLECTING ARTICLE INCLUDING RETARDER

CROSS REFERENCE TO RELATED APPLICATIONS

This application is a national stage filing under 35 U.S.C. 371 of PCT/US2017/053657, filed Sep. 27, 2017, which claims the benefit of U.S. Provisional Application No. 62/461,177, filed Feb. 20, 2017, the disclosure of which is incorporated by reference in its/their entirety herein.

BACKGROUND

Retroreflecting articles are constructions that include at least a retroreflecting element. Retroreflecting elements reflect incident light back in substantially the same direction. Retroreflecting elements include cube-corner prismatic retroreflectors and beaded retroreflectors. Retarders slow one of the orthogonal components of an incident propagating electromagnetic wave more than the other, creating a phase difference resulting in a change—for polarized incident light—in polarization state.

SUMMARY

In one aspect, the present description relates to retroreflecting articles. In particular, the present description relates to retroreflecting articles having a light incidence surface and including a retroreflecting layer and a retardation layer disposed nearer to the light incidence surface than the retroreflecting layer. The retardation layer includes a quarter wave retarder for at least one wavelength in the near infrared range, the retroreflecting layer is non-depolarizing, and the retardation layer is rotationally invariant.

DETAILED DESCRIPTION

Retroreflecting articles like the ones described herein may be useful in certain machine vision detection and sensing systems. As one example, as transportation infrastructure becomes more complicated, vehicles are gaining more driving autonomy. In order to navigate safely and effectively, sensing modules are increasingly incorporated into these vehicles to performs tasks from parking assistance, self-regulating cruise control and lane deviation warning to fully autonomous navigation and driving, including collision avoidance and traffic sign interpretation.

In order to sense the world around them, vehicles use a set of sensors that emit one or more points of light. For example, a lidar (light radar) system may use a constellation of points of light that move through the environment in order to detect potential obstacles or informational objects. These interrogating light beams may use a narrow wavelength band, for example, 2-20 nm, or may use a broad wavelength band, for example, 100 nm or more.

Figure 1:
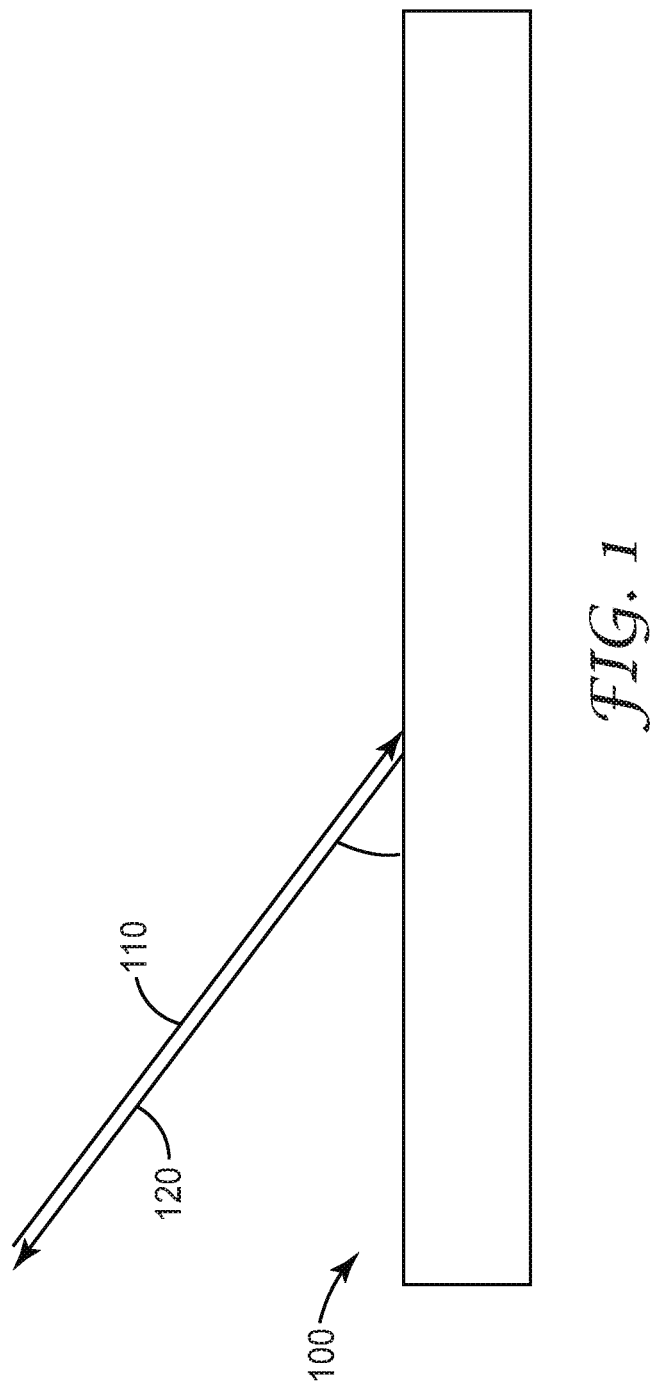
FIG. 1 is a side elevation schematic of a retroreflecting layer.

FIG. 1 is a side elevation schematic of a retroreflecting layer. Retroreflecting layer 100 is shown with incident ray 110 and retroreflected ray 120 being retroreflected by the retroreflecting layer. Retroreflecting layer 100 has an optical structure such that light is reflected substantially toward its source. In other words, any incident ray is reflected substantially 180° from its incident angle. For example, incident ray 110 is retroreflected as retroreflected ray 120, having substantially the same angle with retroreflecting layer 100. Because of the geometry of the optical structure of the retroreflecting layer, there may be some slight translation of the retroreflected ray from the incident ray. In other words, while the incident ray and the retroreflected ray will be substantially parallel, they need not be coincident.

Figure 2:
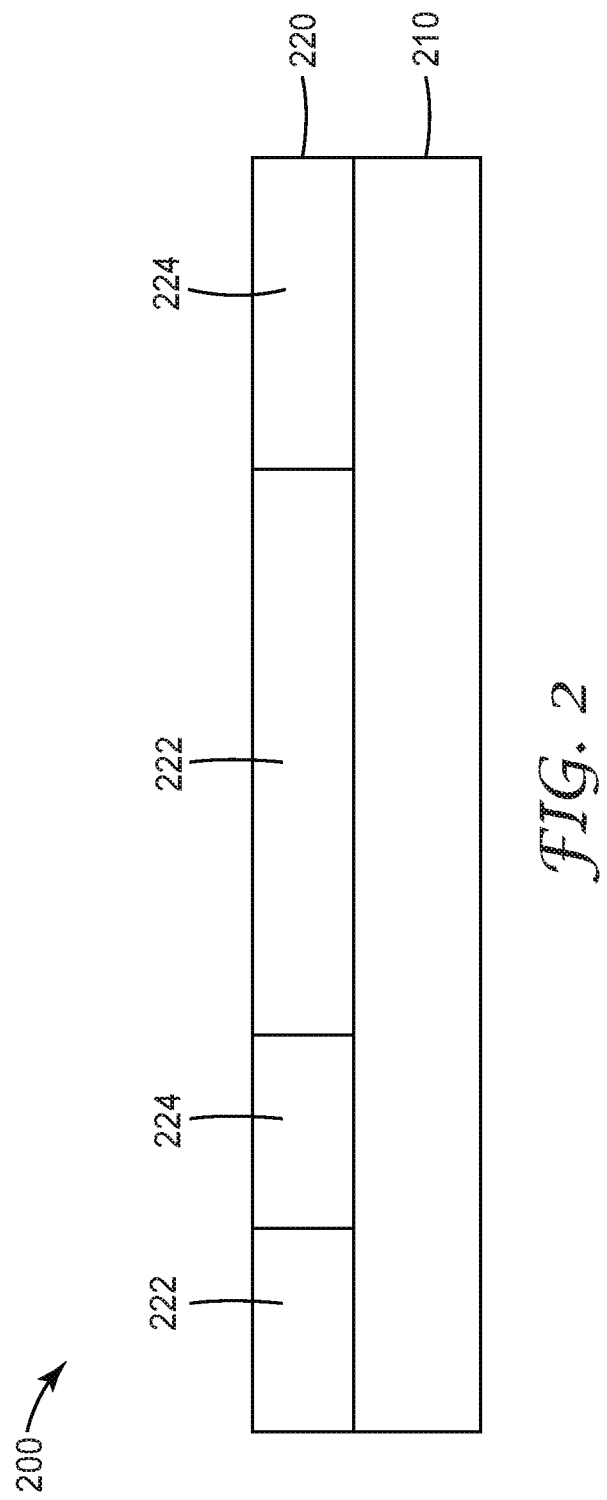
FIG. 2 is a side elevation schematic of a retroreflecting article.

FIG. 2 is a side elevation schematic of a retroreflecting article. Retroreflecting article 200 includes retroreflecting layer 210 and retardation layer 220 having first regions 222 and second regions 224.

Retroreflecting layer 210 may be any suitable retroreflecting layer or combination of layers. For purposes of this description, suitable retroreflectors include retroreflectors that do not substantially depolarize polarized light. For example, suitable retroreflectors include retroreflectors that maintain the polarization of circularly polarized light, or flip the polarization of circularly polarized light. In other words, incident left-handed circularly polarized light that is reflected as left-handed circularly polarized light or as right-handed circularly polarized light should both be considered as non-depolarizing retroreflectors. Depending on the application, some degree of depolarization may be acceptable and to some degree is inevitable based on spatial non-uniformities, from real-world manufacturing conditions, or otherwise. Depolarization may also be dependent to some degree on the angle of incidence for polarized light. In many cases, however, and for the purposes of this description, depolarizing retroreflectors neither flip nor maintain the polarization of incident polarized light. For example, incident left-handed circularly polarized light may return a small portion of left-handed circularly polarized light as part of a larger generally randomized polarization. In other examples using depolarizing retroreflectors, incident left-handed circularly polarized light may be returned as elliptically polarized light or linearly polarized light. Again, for the purposes of this description, these types of retroreflectors should not be considered non-depolarizing retroreflectors.

Suitable retroreflectors that do not depolarize polarized light (at least to a degree potentially applicable for the current description) include metal-backed prism (cube-corner) retroreflectors, metal-backed beaded retroreflectors, and beaded retroreflectors partially immersed in binder optionally including, for example, nacreous or other reflective flake material. Air-backed prisms that rely on total-internal reflection to retroreflect incident light were observed to depolarize incident light, as described within the comparative examples provided herein.

The retroreflecting layer may be any suitable size and have any suitable size elements. For example, microreplicated prisms or beads used in the retroreflecting layer may be on the order of several micrometers in size (width or diameter), tens of micrometers in size, hundred of micrometers in size, or several millimeters in size, or even several centimeters in size. Beads of multiple different sizes and size distributions may be utilized as appropriate and suitable for the application. Depending on the retroreflected wavelength of interest, there may be a certain practical minimum feature size in order to prevent diffractive and other sub-wavelength feature effects from influencing or even dominating the desired optical performance.

For beaded retroreflectors, glass beads are commonly used, but any substantially spherical material can be used. The materials may be selected based on durability, environmental robustness, manufacturability, index of refraction, coatability, or any other physical, optical, or material property. The beads may be partially submerged into a reflective binder, containing, for example, nacreous or metal flake, or they may be partially metallized through vapor coating, sputter coating, or any other suitable process. In some embodiments, the beads may be coated with a dielectric material. In some embodiments, a metallic or metalized film may be laminated or otherwise attached to the bead surface. In some embodiments, the coating or layer may be a spectrally selective reflector. In some embodiments, beads may create an optical path, through a non-reflective binder, between the light incident surface of a retroreflector and a metal or metallized polymeric film as a substrate. The binder may have any physical properties and may impart certain desired properties to the retroreflecting layer. For example, the binder may include a pigment or dye to impart a colored effect to the retroreflective article.

For prismatic retroreflectors, any suitable prismatic shape may be microreplicated or otherwise formed in a transparent (at least transparent to the wavelength of interest) medium. In some embodiments, a cast and cure microreplication process is used to form the prismatic surface. For example, right angle linear prisms, such as those in Brightness Enhancing Film (BEF), may be used, although such prism would not be retroreflecting over a very wide range of angles. Cube corners are widely used as a retroreflecting prismatic shape, where each incident light ray is reflected three times before being returned to the incident direction. Other surfaces having more facets may be used as a prismatic retroreflector. Any suitable microreplicable resins may be used; in particular, resins that may be applied in a liquid or flowable form and then subsequently cured and removed from a tool may be used. The tool can be formed through any suitable process, including etching (chemical or reactive ion etching), diamond turning, and others. In some embodiments, the tool can be a fused or otherwise attached collection of multiple parts to cover a full prismatic sheet surface pattern. Curing may take place through the addition of heat or electromagnetic radiation. UV-curable resins or resins that are curable through atypical ambient conditions may be chosen as to not unintentionally partially or fully cure during handling or pre-cure processing. In some embodiments, additive or subtractive manufacturing processes may be used to form either a tool surface for microreplication or the prismatic surface itself.

Retardation layer 220 may be any suitable retardation layer that selectively slows one of the orthogonal components of light in order to change its polarization. In some embodiments, retardation layer 220 may be configured as a quarter wave retarder. A quarter wave retarder has a retardance that, for a certain wavelength of interest $\lambda$, has a retardance of $\lambda/4$. A quarter wave retarder for a given wavelength of light will convert it from circularly polarized light to linear polarized light or vice versa. In some applications, a quarter wave retarder may function acceptably without having perfect $\lambda/4$ retardance. For some applications, using an achromatic retarder may permit substantially quarter wave retardance to be maintained over a range of wavelengths; for example, a range of wavelengths spanning 2 nm, 10 nm, 20 nm, 40 nm, 50 nm, 100 nm, 150 nm, 200 nm, 300 nm, 400 nm, or even 500 nm. In some embodiments, the quarter wave retarder has substantially quarter wave retardance over the entire near-infrared wavelength range, for example, 700 to 1400 nm. In some embodiments, the quarter wave retarder has substantially quarter wave retardance over the entire visible wavelength range, for example, 400 to 700 nm. In some embodiments, the quarter wave retarder has substantially quarter wave retardance over both the near-infrared and visible range.

In some embodiments, retardation layer 220 may provide substantially similar retardance values over an wide range of incidence angles. In some embodiments, the retardance may not vary by more than 10% over a 30 degree half-angle cone, may not vary by more than 10% over a 45 degree half-angle cone, or may not vary by more than 10% over a 60 degree half-angle cone. For some applications, not varying more than 20% over a 30, 45, or 60 degree half angle cone may be acceptable.

Retardation layer 220 may include any suitable retarding material or materials. In some embodiments, retardation layer 220 includes or is a liquid crystal retarder. In some embodiments, retardation layer 220 includes an oriented birefringent polymer film. Depending on the birefringence of the chosen polymer set, suitable thickness may be chosen in order to obtain the desired retardance values. In some embodiments, retardation layer 220 may include a compensation film or other additional film with low retardance (for example, less than 100 nm of retardance) in order to enhance or preserve circularly polarized light over a wide range of angles for a wavelength or wavelength range of interest.

In some embodiments, retardation layer 220 may be unpatterned, or in some embodiments it may be patterned, as shown in FIG. 2. Retardation layer 220 may include at least first regions 222 and second regions 224, arranged in any spatial pattern, gradient, or any other arrangement. First regions 222 and second regions 224 differ at least by their retardation of incident light. For example, in one embodiment, first regions 222 may have retardance of a quarter wave for incident light of a first wavelength. At the same time, second regions 224 may have substantially zero retardance for incident light of that first wavelength. In some embodiments, second regions 224 may substantially absorb light at that first wavelength. In some embodiments, second regions 224 may substantially depolarize light at the first wavelength. Retardation layer 220, if patterned, may encode or display information. The information may be human readable, machine readable, or both human and machine readable.

Retroreflecting article 200 may enable particular sensor systems to operate with a high degree of fidelity. For example, a sensor that detects circularly polarized light (for example, a charge coupled device or CMOS used in conjunction with a filter that passes left-handed circularly polarized light may be a useful sensor configuration. Interrogated with left-handed circularly polarized light, for example, retroreflecting article 200 may provide certain portions (depending on the configuration and optics of retroreflecting layer 210 and retardation layer 220 that retroreflect left-hand circularly polarized light. These may appear bright or be otherwise detectable with such a sensor configuration. In other portions of retroreflecting article 200, the left-hand circularly polarized interrogation light may be depolarized, absorbed, or flipped to right-hand circularly polarized light. Such regions would appear dark or be difficult to detect with such a sensor configuration.

In some embodiments, by utilizing circularly polarized light, several potential advantages may be realized. In particular, circularly polarized light tends to be rare in nature, reducing the probability of a false positive signal or other interference. Further, in contrast, the use of linearly polarized light in these applications creates a very high sensitivity to the angle of incidence, significantly changing the appearance or intensity of retroreflected light rapidly depending on vertical and horizontal translation or observation angle.

In some embodiments, retroreflecting article 200 may be configured to operate in the near-infrared wavelength range. Certain sensor systems utilize near-infrared light in order to operate within wavelengths that are invisible to humans. In some embodiments, retroreflecting article 200 may include a retroreflecting layer 210 that retroreflects near-infrared light, and a retardation layer 220 that is configured as a quarter wave retarder for at least one wavelength in the near-infrared wavelength range.

Figure 3:
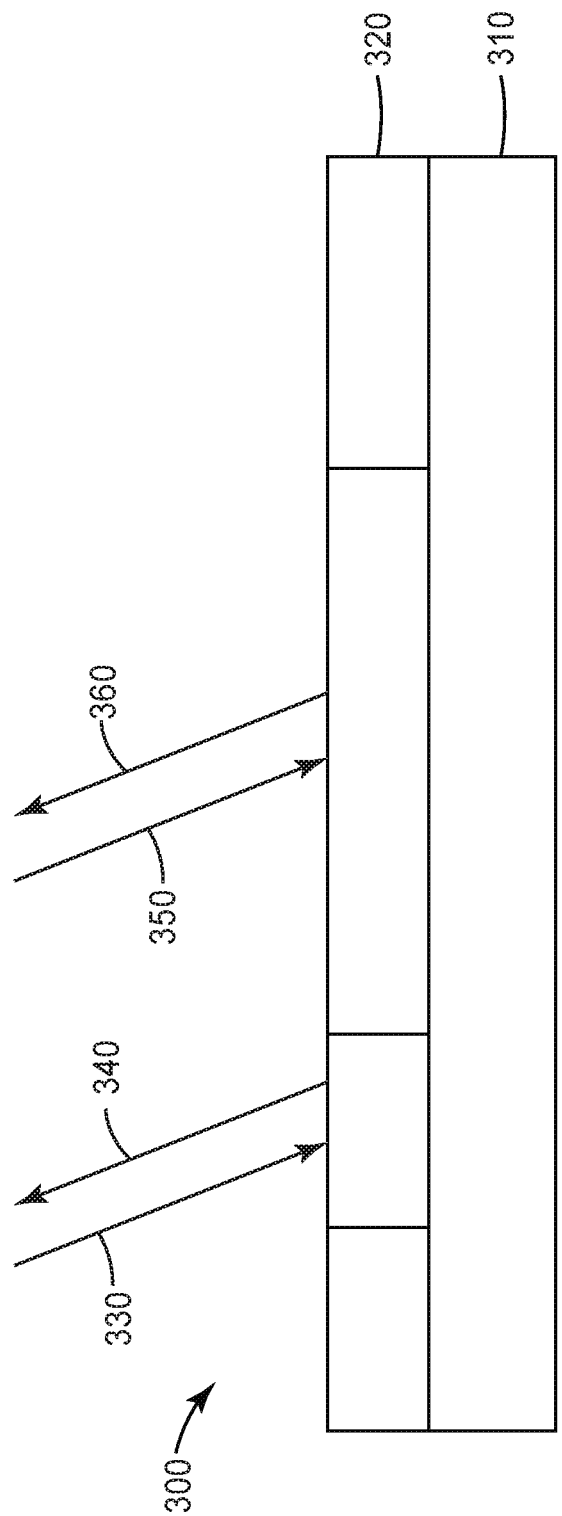
FIG. 3 is a side elevation schematic showing the general operating principles of the retroreflecting article of FIG. 2.

FIG. 3 is a side elevation schematic showing the general operating principles of the retroreflecting article of FIG. 2. Retroreflecting article 300 includes retroreflecting layer 310 and retardation layer 320. First incident ray 330 and first retroreflected ray 340 and second incident ray 350 and second retroreflected ray 360 illustrate the general functionality of the retroreflecting article.

As an example, first incident ray 330 and second incident ray 350 may each be considered to be left-hand circularly polarized light. First incident ray 330 and second incident ray 350 are each incident on regions of retroreflecting article 300, in particular, on regions of retardation layer 320 having different retardation properties. For the purposes of this example, it is assumed that retroreflecting layer 310 has the property of being circular polarization flipping (though not depolarizing); for example, left-hand circularly polarized light is converted to right-hand circularly polarized light, but linearly polarized light is not converted to light having an orthogonal polarization orientation. Further, is assumed that retardation layer 320 is configured at least in some regions as a quarter wave retarder, at least for the wavelength of the incident rays and at their incident angles.

First incident ray 330 is incident on a region of retardation layer 320 configured as a quarter wave retarder, is converted from left-hand circularly polarized light to linearly polarized light, and is preserved in its linearly polarized state while retroreflecting. Upon repassing through retardation layer 320, it is converted back into circularly polarized light having the same handedness as the incident light. A detector passing left-hand circularly polarized light would detect first retroreflected ray 340.

Second incident ray 350 is incident on a region of retardation layer 320 that has substantially zero retardance for the incident ray. Second incident ray is not converted to linearly polarized light and so has its handedness flipped when retroreflected by retroreflecting layer 310. Second retroreflected ray 360 is right-hand circularly polarized light and therefore for the same detector as described before—a detector passing left-hand circularly polarized light—second retroreflected ray 360 would not be detected.

Figure 4:
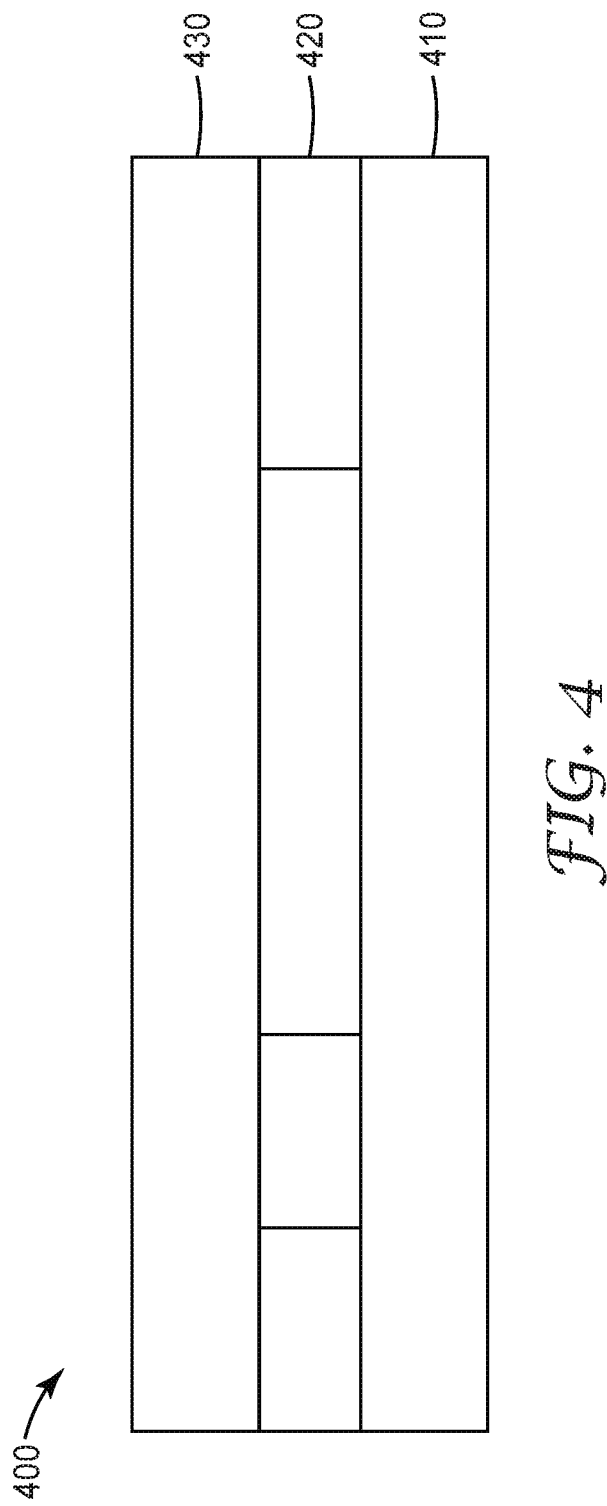
FIG. 4 is a side elevation schematic of another retroreflecting article.

FIG. 4 is a side elevation schematic of another retroreflecting article. Retroreflecting article 400 includes retroreflecting layer 410, retardation layer 420, and attenuation layer 430.

In some embodiments, retroreflecting article 400 that is similar to retroreflecting article 300 except that it further includes an attenuation layer may useful. Attenuation layer 430 may be any suitable attenuation layer, including layers that attenuate light through absorbing particular wavelengths. In some embodiments, broadband absorbers such as carbon black may be used. In some embodiments, selectively absorbing dyes or pigments may be used. In some embodiments, dyes or inks that pass light in a certain wavelength spectrum (i.e., that are transparent or highly transmissive in certain wavelength ranges) but absorb light in a different wavelength spectrum may be used. In some embodiments, an attenuation layer that absorbs light in the visible spectrum but substantially transmits light in the near-infrared spectrum may be used (i.e., a camouflage layer). For some applications, it may be desirable to have a visually inconspicuous retroreflector in order to provide information to detectors without being distracting or confusing. In some embodiments, attenuation layer 430 may reduce the light retroreflected from retroreflecting article 400 to avoid overglow, blooming, or other detection artifacts resulting from having a contrast that is too extreme.

Attenuation layer 430 may also be or include any surface or bulk scatterer in order to attenuate the light retroreflected along the expected cone of retroreflected angles. In other words, attenuation layer 430 may be any suitable material or combination of materials in order to reduce the well-known measurement of retroreflective efficiency, $R_A$. Retroreflectivity ($R_A$) can be measured using the test criteria described in ASTM E810-03 (2013)—Standard Test Method for Coefficient of Retroreflective Sheeting ($R_A$) using the Coplanar Geometry at 0.2° observation angle and 5° entrance angle, i.e. 0.2/5° angle.

Figure 5B:
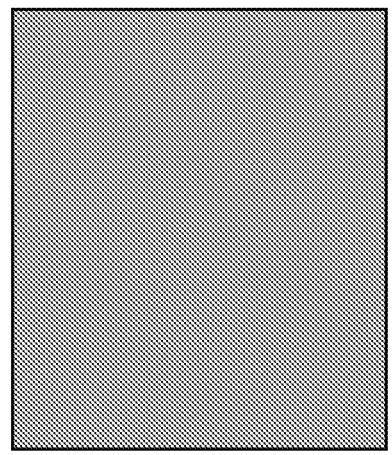
FIG. 5A-5B are front elevation schematics of a retroreflecting article illuminated with circular polarized light of one handedness and the other handedness, respectively.
Figure 5A:
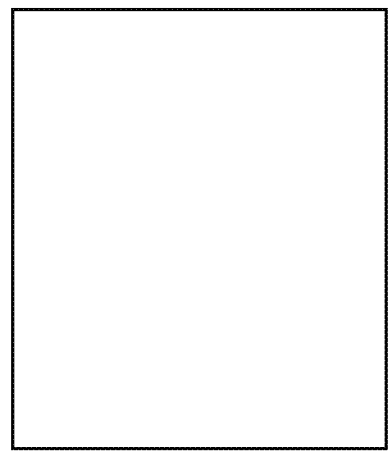

FIG. 5A-5B are front elevation schematics of a retroreflecting article illuminated with circular polarized light of one handedness and the other handedness, respectively. FIG. 5A illustrates a retroreflecting article illuminated with circularly polarized light of one handedness and viewed through a circular polarizing filter. In one example, because the handedness of the incident light is preserved, and because the light pass handedness of the polarizing filter is the same as the incident light, the retroreflecting article appears bright. Naturally, other combinations of components such as the incident light polarization, retroreflector type (for example, handedness-preserving or handedness-reversing), and pass-handedness of the circular polarizing filter apparent to the skilled person may be utilized to result in the retroreflecting article's bright appearance.

FIG. 5B is similar to FIG. 5A except that that the retroreflecting article is dim or invisible when viewed through a circular polarizing filter. In one example, because the handedness of the incident light is preserved, and because the light pass handedness of the polarizing filter is the opposite of the incident light, the retroreflecting article appears dark. Similarly, other combinations of components such as the incident light polarization, retroreflector type, and light pass handedness of the circular polarizer may be selected to provide a similarly dark appearance. In many cases, the same retroreflecting article can be bright under one set of illumination and sensing conditions, yet dark under different illumination and sensing conditions.

Notably, the interrogation light (the handedness of the light source including using, in some examples, two light sources having different handedness) or the handedness of the polarizing filter covering a detector or sensor may be rapidly alternated or switched. This would create a flashing appearance of the retroreflecting article that would help increase its conspicuity among other objects. Alternatively, two separate detectors for light of each handedness may be able to detect the difference between the images sensed by each detector. This may help to increase the read accuracy or readability of a spatially variant code or pattern on the retroreflecting article. In some embodiments, the alternating effect may help a sensor distinguish information near the edges of a informational pattern or code. In some cases, the observed flashing effect may help further differentiate readable signs or codes from natural or artificial, non-readable objects. In some embodiments, the retroreflecting article may provide different or additional information in each state.

Figure 6:
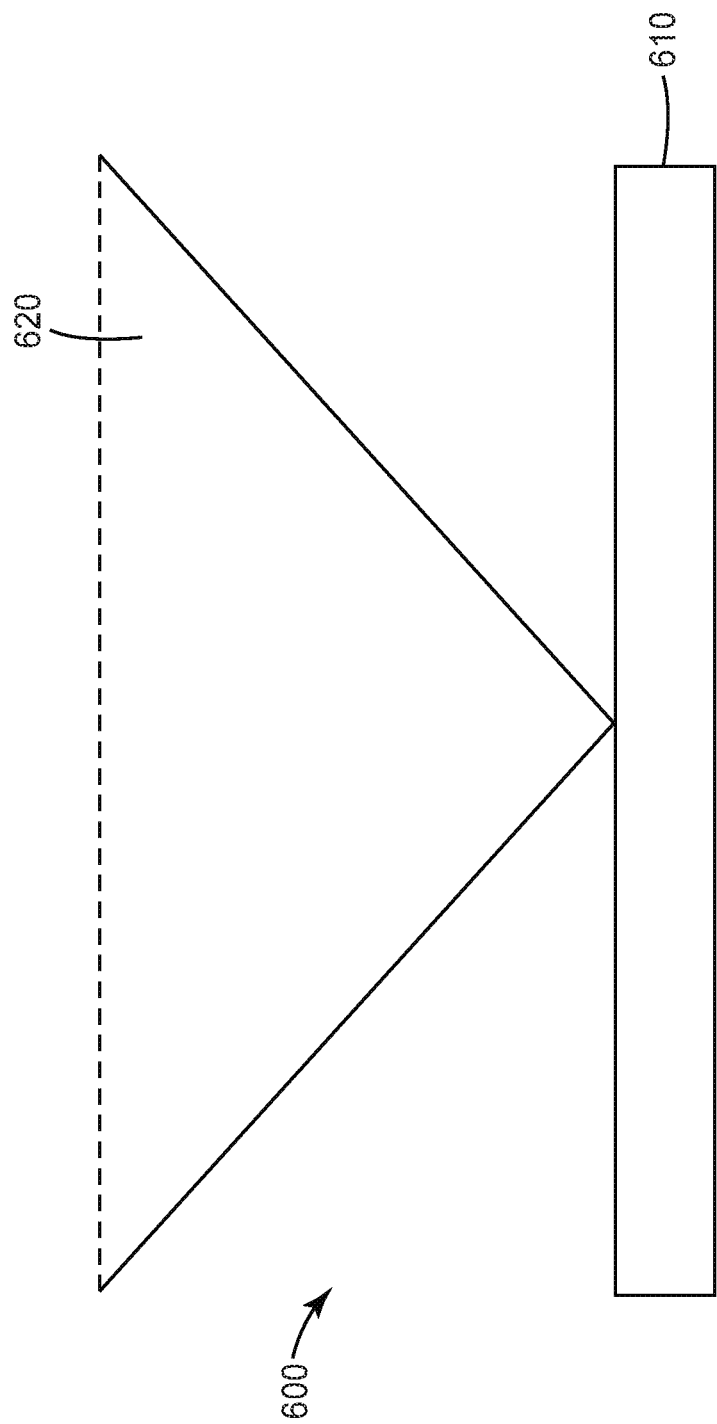
FIG. 6 is a side elevation schematic illustrating a range of incidence angles for a retroreflecting article.

FIG. 6 is a side elevation schematic illustrating a range of incidence angles for a retroreflecting article. Retroreflecting article 600 includes retroreflecting layer 610 and range of incidence angles 620. As discussed elsewhere in this description, retroreflecting articles described herein may have a usefully wide range of incidence angles. Range of incidence angles 620 may include both change in polar angle (deviation from the normal to the surface of the retroreflecting article) and change in azimuthal angle (rotation around the normal to the surface of the retroreflecting article). In some embodiments, the range of incidence angles may be described by a cone with a characterizing half-angle. In some embodiments, the range of incidence angles may be where the retroreflective efficiency is not below 70% of its maximum value for a given circular polarization and wavelength of light. In some embodiments, the range of incidence angles may be where the retroreflective efficiency is not below 80% of its maximum value for a given circular polarization. Of course, the circular polarization used to characterize the range of incidence angles should be one that is measurable or detectable by a detector. The retroreflective efficiency for retroreflecting articles described herein is both a product of the retroreflecting layer's inherent retroreflective efficiency as a function of angle but also the ability of the retarder layer to maintain substantially circular polarizations over that same angular range.

Figure 7:
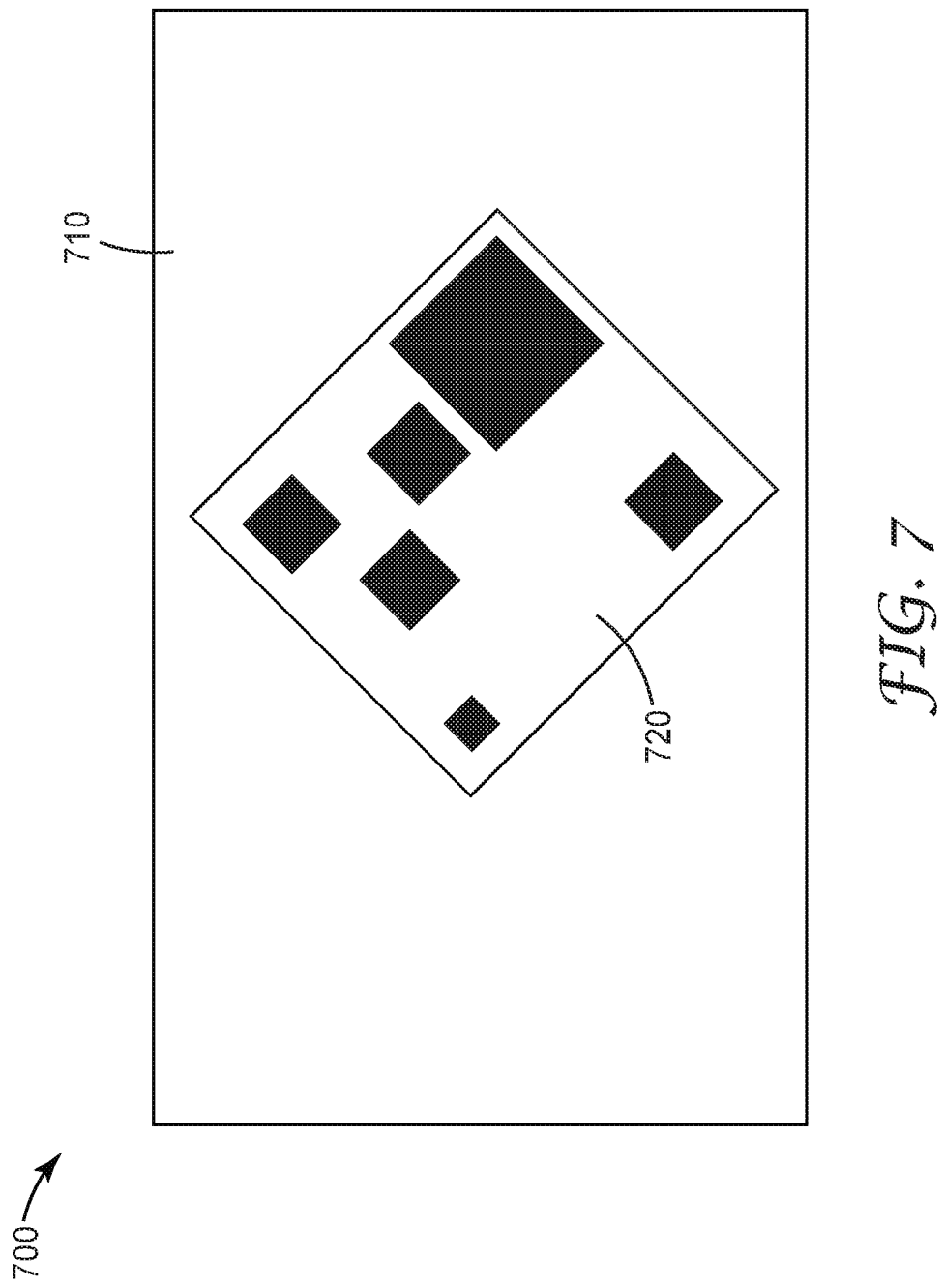
FIG. 7 is a retroreflecting article including an arbitarily-aligned film.

FIG. 7 is a retroreflecting article including an arbitrarily-aligned film. Retroreflecting article 700 includes retroreflecting layer 710 and arbitrarily-aligned film 720.

Another advantage of utilizing circularly polarized light and a quarter wave retarder is that the pattern visibility is largely invariant as a function of azimuthal alignment. In other words, such a retarder may be rotationally invariant with respect to the retroreflecting layer. In some embodiments, this means that the retroreflecting layer has a retroreflective efficiency of not less than 80% of a maximum value as the retarder is rotating about the azimuth. As shown in FIG. 7, retroreflecting article 700 includes an arbitrarily-aligned film 720 that includes a patterned retardation layer as described elsewhere herein. For purposes of illustration, retroreflecting article 700 is assumed to be illuminated and detected under conditions that allow the pattern on the arbitrarily-aligned film to be visible (i.e., in certain embodiments the pattern would be invisible if not illuminated with circularly polarized light or even at all to human eyes). Applications related to this advantage include temporarily attachable stickers or decals that can be placed on signs, clothing, vehicles, horizontal surfaces, infrastructure, buildings, or the like. Because the quarter wave retarder does not need to be carefully aligned with the detector's polarizer, such decals may be easily attached without worry of misorientation or misalignment causing faulty or incomplete detection. Such decals or stickers may be temporarily attached to provide new machine-readable meanings to signs, clothing, or any other attachable surface.

Retroreflecting articles as described herein may be useful for traffic control signs and directional/navigational infrastructure. In some embodiments, retroreflecting articles as described herein may be useful as rigid signs. In some embodiments, these articles may be or included in temporary traffic control devices, such as cones or flags or portable signs. In some embodiments, these articles may be used or incorporated into clothing or wearable items, such as conspicuity vests, helmets, or other safety equipment. In some embodiments, the retroreflecting articles may be conformable, bendable, or foldable. In some embodiments, these articles may be attached to any type of vehicle, such as a car, motorcycle, airplane, bicycle, quadcopter (drone), boat, or any other vehicle. In some embodiments, these articles can be used for inventory control in a warehouse, train yard, shipyard, or distribution center, allowing, for example, for the automated identification of the content of shelves, boxes, shipping containers, or the like.

Retroreflecting articles as described herein may be any suitable size, from small decals or stickers including pressure sensitive adhesive to large, highly visible traffic signs. Substrates to provide rigidity or easy adhesion (for example, pressure sensitive adhesion) may be also included behind the retroreflecting layer without affecting the optics of the retroreflecting article.

EXAMPLES

Example

TABLE 1

| | Description | Source |
|---|---|---|
| Materials/Acronyms | | |
| EHA | 2-Ethylhexyl acrylate | BASF, Florham Park, NJ. |
| IBOA | Isobornyl acrylate | San Esters, New York, NY. |
| AA | Acrylic acid, available from BASF, | Florham Park, NJ. |
| HEA | 2-Hydroxyl ethyl acrylate, available from | BASF, Florham Park, NJ. |

TABLE 1-continued

| | Description | Source |
|---|---|---|
| CN965 | An aliphatic polyester based urethane diacrylate oligomer | Sartomer Americas, Exton, PA,. |
| Irg 651 | 2,2-Dimethoxy-1,2-diphenylethan-1-one | BASF Corporation, Vandalia, IL. |
| Irg 819 | Bis(2,4,6-trimethylbenzoyl)-phenylphosphineoxide | BASF Corporation, Vandalia, IL. |
| B60H | Poly(vinyl butyral) having a glass transition temperature (Tg) of 70° C. | Kuraray, Houston, TX. |
| PVB | Polyvinyl butyral polymer is commercially available from under the trade designation "Mowital ™" | Kuraray |
| Retroreflective sheet | | |
| 3M 6360 | Scotchlite reflective material white high gloss smooth trim. Microprismatic air gapped retroreflector. | 3M Company, St Paul, Mn. |
| 3M 8830 | Scotchlite Silver helmet marking film. Metallized beads | 3M Company, St Paul, Mn. |
| 3M 8965 | Scotchlite reflective fabric with nacreous flake in an adhesive with partially submerged beads | 3M Company, St Paul, Mn. |
| 3M 8887 | Scotchlite fluorescent lime yellow marking film having dielectric coated beads | 3M Company, St Paul, Mn. |
| 3M PRXF2340 | Scotchlite 3M flexible prismatic conspicuity marking tape. PRXF2340 is a metallized microprismatic retroreflective sheeting. | 3M Company, St Paul, Mn. |
| Liquid Crystal Materials | | |
| LPP | Liquid crystal alignment layer material, ROP-131 EXP 306 | Rolic Technologies |
| LPC | Liquid crystal polymer ROF-5185 EXP 410 | Rolic Technologies |
| Retarder sheeting | | |
| API QWF | an achromatic quarter-wave film (QWF), APQW92-003-PC | American Polarizer, Inc. (API QWF) |
| LCPET | Liquid Crystal Polymer coated on commercial PET film | Coating as described below |
| PET | Commercial PET base for LCPET, MYLAR ® A 2 mil (50 micron) thickness | Dupont/Teijen |
| LCA1/LCA2 | Liquid Crystal Polymer coated on acrylic film (LCA1 at 1 micron thickness, LCA2 at 8 microns thickness) | Coating as described below |

Retarder Film Fabrication 1. (API) A commercially available, oriented polycarbonate quarter wave retarder from American Polarizers, Inc (APQW92-003-PC)
2. (LCPET) A commercially available 2 mil polyester film (Dupont/Teijen) was coated with a liquid crystal polymer retarder coating including, first, a liquid crystal alignment layer and, second, a liquid crystal polymer. The liquid crystal alignment layer is a linear photo polymer (LPP) type that was slot die coated to be between 100 and 150 nm thick when dry. The LPP was cured with a Fusion Systems UV lamp through a wire grid polarizer obtained from Moxtek, Inc. The polarizer was oriented such that the wire grid was 15° from the machine direction of the PET substrate in order to create an oriented alignment layer for the liquid crystal polymer. In a second slot die coating pass, a liquid crystal polymer (LCP) was applied to the LPP coated polyester film such that the dry thickness was around 1 µm. The LCP was cured using a blanket UV exposure from a Fusions Systems UV lamp in order to lock in the orientation of the liquid crystal molecules.
3. (LCA1/LCA2) In each case an acrylic film was coated from base syrup were prepared by mixing the components in the amounts shown in Table 2 (below) as follows. Acrylic monomers, crosslinker, ultra-violet absorbers (UVAs) and photoinitiator were combined in a 1 gallon (3.79 liters) glass jar and mixed using a high shear electric motor to provide a homogeneous mixture. Next, B60H was then added over a period of about three minutes with mixing. This was followed by further high speed mixing until a homogeneous, viscous solution was obtained. This was then degassed for ten minutes at a vacuum of 9.9 inches (252 millimeters) mercury. The Base Syrup (refer Table 2) was coated using a notch bar coater at a thickness of 0.002 inches (51 micrometers) onto a PET film. Base Syrup was partially cured by exposing the open surface of the composition in a nitrogen-inerted environment to a total UVA energy of approximately 90 milliJoules/square centimeter to give an acrylic/PVB film on PET. Adhesive syrup was prepared by charging a one gallon (3.8 liters) jar with 1784 grams IOA, 16.2 grams AA, 360 grams IBOA, 54 grams DPA, and 0.72 grams 651 photoinitiator and stirred until the photoinitiator had dissolved and a homogeneous mixture was obtained. The mixture was degassed by introducing nitrogen gas into it through a tube inserted through an opening in the jar's cap and bubbling vigorously for at least 5 minutes. While stirring, the mixture was exposed to UVA light until a pre-adhesive syrup having a viscosity deemed suitable for coating was formed. Following UV exposure, air was introduced into the jar. Next, 360 grams IBOA, 4.32 grams Irg 651, 518.4 grams Reg 6108, and 1.35 grams Irg 1076 were added to the pre-adhesive syrup and mixed by rolling overnight.

A first layer of pressure sensitive adhesive was provided by coating Adhesive Syrup onto PET using a notch bar coater at a thickness of 0.002 inches (51 micrometers). The irradiated acrylic/PVB film/PET combination was brought into intimate contact with the Adhesive Syrup coated PET using two-roll coating station having a total gap setting of 0.008 inches (203 micrometers) and exposed to a total UVA energy of 958 milliJoules/square centimeter. A construction having, in order, PET, a PSA, acrylic/PVB film, and PET was obtained. Next, the PET in contact with the acrylic film was removed. A second layer of pressure sensitive adhesive was provided by coating Adhesive Syrup onto PET using a notch bar coater at a thickness of 0.002 inches (51 micrometers) and brought into intimate contact with the exposed surface of the acrylic/PVB film using a two-roll coating station having a total gap setting of 0.010 inches (254 micrometers). The open surface of the second adhesive in a nitrogen-inerted environment was cured by exposure to a total UVA energy of 958 milliJoules/square centimeter.

TABLE 2

Base Syrup Formulation (parts by weight)

| EHA | IBOA | AA | HEA | CN965:IBOA [1:1] | Irg 651 | B60H |
|---|---|---|---|---|---|---|
| 19.8 | 20.9 | 11.6 | 11.6 | 16.3* | 0.23 | 19.6 |

TABLE 3

Adhesive Syrup Formulation (parts by weight)

| IOA | IBOA | AA | DPA | Irg 651 | Reg 6108 | Irg 1076 |
|---|---|---|---|---|---|---|
| 57.6 | 23.2 | 0.5 | 1.7 | 0.2 | 16.7 | 0.04 |

Having thus obtained the composite adhesive coated acrylic film, a liquid crystal polymer retarder coating was added as alignment layer and liquid crystal polymer. The liquid crystal alignment layer is a linear photo polymer (LPP) type, Rolic Technologies ROP-131 EXP 306, that was coated using a #0 K-bar to produce an alignment layer that was between 100 and 150 nm thick when dry. The LPP was cured with a Fusion Systems UV lamp through a wire grid polarizer, UVT240A, obtained from Moxtek, Inc. The polarizer was oriented such that the wire grid was 45° from the machine direction of the acrylic substrate in order to create an oriented alignment layer for the liquid crystal polymer. After curing the LPP, a liquid crystal polymer (LCP), Rolic ROF-5185 EXP410, was applied. LCA1 coating used a #1 K bar to the LPP coated acrylic film such that the dry thickness was around 1 μm. LCA2 coating used a a #4 K bar to the LPP coated acrylic film such that the dry thickness was around 8 μm. In both cases, the LCP was cured using a blanket UV exposure from a Fusions Systems UV lamp in order to lock in the orientation of the liquid crystal molecules.

Retarder Test Method and Results:

Retardation for each film type was measured using an Axiometrics Mueller matrix polarimeter. The on-axis retardation measurements in each case are made at 550 nm.

TABLE 4

Measured Retardance (550 nm, normal incidence) for each retarder type

| Retarder Type | Measured Retardance [nm] |
|---|---|
| API QWF | 139.4 nm |
| LCPET | 134.6 nm |
| LCA1 | 125.0 nm |
| LCA2 | 1270 nm* |

*Estimated value complicated by higher order optical measurement

Retro-reflected imaging test method:

The same test method was used to verify performance for all combinations of retroreflective materials and retarder sheeting materials described in these examples. In each instance the testing involves (1) illuminating the samples, (2) capturing the camera image of the retro-reflected light pattern and (3) extracting and analyzing measurement profiles from the captured images. In most cases, the illumination source was circularly polarized light. In this case, identical circular polarizers were placed over both the light source and the camera lens. The circular polarizer consisted of a linear polarizer (intrinsic to ring illuminator) overlaid with an achromatic quarter-wave film (QWF) from American Polarizer, Inc. (API QWF), with an angle of 45° between the polarization direction of the polarizer and the optic axis of the API QWF. In cases of linearly polarized source, the quarter-wave film was not required.

The following optical setup was common to all retro-reflected imaging tests. The retro-reflective illumination source was a 3.25 inch diameter white LED ring light. Visible retroreflective photographs of samples were taken with a Basler acA2000-165uc (ID 106540-21) camera with an aperture of f/16 at a distance of 5 feet, using a lens (Edmund Optics 8.5mm/f1.3 (ID 58-000)), with an aperture of f/8 at a distance of 5 feet. The camera was positioned on the center of the ring light and parallel to the center of the sample, with an entrance angle ranging from 5° or 60° degree to the sample adhered to a vertical rotation stand as noted. The observation angle is close to 1.5 degree. The camera exposure time was adjusted to 10 ms.

Each image was loaded into image processing application and a rectangular region of interest was defined on the image; this was useful for generation of the line-scan profile of measured intensity. For a horizontal cross-section, pixel gray-scale values within the region of interest for the each of the red, green, and blue channels were then averaged by column for each row position and plotted by pixel position. For a vertical cross-section, pixel gray-scale values within the region of interest for the each of the red, green, and blue channels were then averaged by row for each column position and plotted by pixel position. The red, green, and blue values thus determined are plotted in the line charts below. A picture is provided to show the location from which the cross-sections were derived. A line denotes the center and direction of the rectangular region of interest. Note that pixels on either side of the line have been used to determine an average gray-scale value for that pixel location.

Example Construction Overview

Samples were configured to show advantageous combinations of retro-reflector and retarder element as illuminated with either circularly or linearly polarized light. In order to provide a measure of contrast, each of the flat plate measurements includes recorded camera values from areas of the retro-reflector with and without the intervening retarder film. We define the contrast as the ratio of the measured of retro-reflected light intensity with retarder divided by the measured light intensity without the retarder element.

TABLE 5

Example Overview

| Example | Retro-reflector | Retarder | Illumination/ Camera sense | Test object |
|---|---|---|---|---|
| EX-1 | 3M PRXF2340 | API ¼ Wave | Circular | 4" curved cylinder |
| EX-2 | 3M PRXF2340 | LCPET | Circular | 4" curved cylinder |
| EX-3 | 3M PRXF2340 | API ¼ Wave | Circular | Flat plate |
| EX-4 | 3M 6360 | API ¼ Wave | Circular | Flat plate |
| EX-5 | 3M 8830 | API ¼ Wave | Circular | Flat plate |
| EX-6 | 3M 8965 | API ¼ Wave | Circular | Flat plate |
| EX-7 | 3M 8887 | API ¼ Wave | Circular | Flat plate |
| EX-8 | 3M 8830 | API ¼ Wave | Circular | Flat plate |
| EX-9 | 3M 8830 | LCPET | Circular | Flat plate |
| EX-10 | 3M 8830 | LCA1 | Circular | Flat plate |
| EX-11 | 3M 8830 | LCA2 | Circular | Flat plate |
| EX-12 | 3M 8830 | LCA1 | Circular | Flat plate |
| EX-13 | 3M 8830 | LCPET | Circular | Flat plate |
| EX-14 | 3M 8830 | API ¼ Wave | Linear Parallel | Flat plate |
| EX-15 | 3M 8830 | API ¼ Wave | Linear Crossed | Flat plate |

Example 1

Sample was composed of API ¼ wave retarder overwrapping Scotchlite 3M flexible prismatic conspicuity marking tape (PRXF2340). For this example, the combination was wrapped over a 4 inch diameter cylinder to demonstrate the sensitivity of the material to various entrance angles. The purpose of wrapping around a cylinder was to create a range of entrance angles and to demonstrate the difference in angular uniformity.

The API retarder show no fringes for any position, indicating that the API retarder returned near circularly polarized light regardless of incidence angle.

A cross section of the image was analyzed using the line scan procedure for red, green, and blue channels and shown in the corresponding figure.

Figure 8:
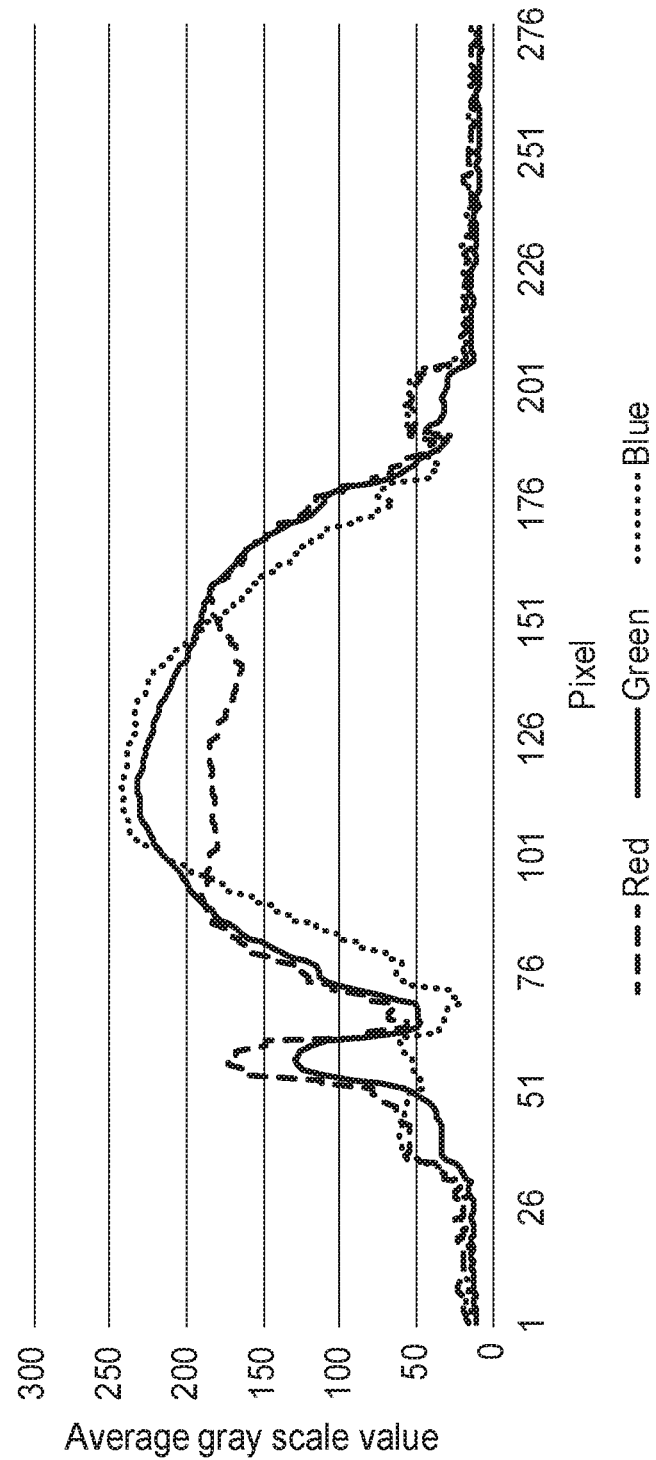
FIG. 8 is a horizontal scan of Example 1.

FIG. 8: Example 1, Horizontal through the API QWF. Color changes here are much smoother and no color ringing or fringing is perceived. (Note that the peak between pixels 50 and 65 is due to an object behind the 4-inch roll and should be ignored.)

Example 2

Sample composed of LCPET over Scotchlite 3M flexible prismatic conspicuity marking tape (PRXF2340) was wrapped over a 4 inch diameter cylinder to demonstrate the sensitivity of the material to various entrance angles.

Numerous color fringes were observed at various positions on the curved LCPET retarder.

Figure 9:
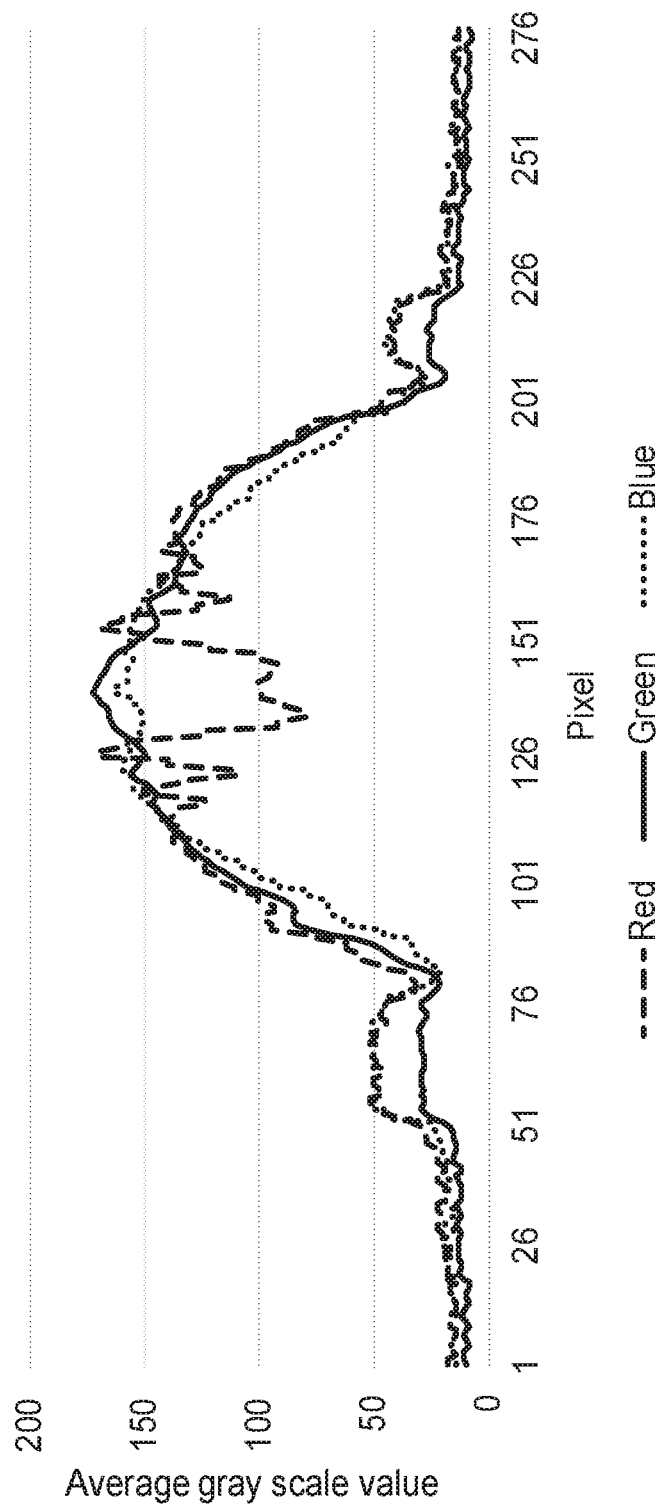
FIG. 9 is a horizontal scan of Example 2.

FIG. 9: Example 2, Cross-section 1. Horizontal through LCPET retarder. Note the ripple in the red signal leading to perceived color fringing near the center of the feature.

Example 3

Sample composed of API QWF retarder on Scotchlite PRXF2340 metallized microprismatic retroreflective sheeting.

In this example retroreflector was mounted on a flat surface and illuminated with circularly polarized light. Then the API QWF retarder was used to partially cover the retroreflector and a photo taken and analyzed.

Figure 10:
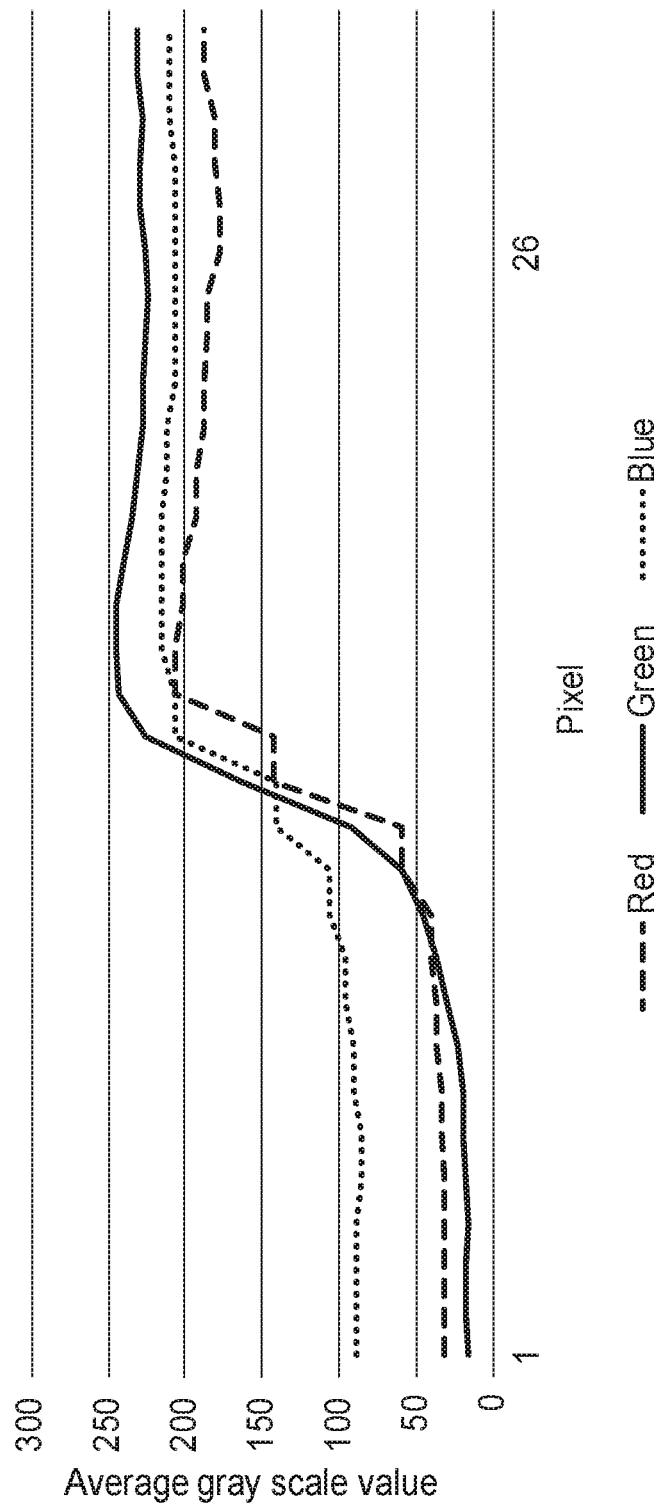
FIG. 10 is a vertical scan of Example 3.

FIG. 10: Example 3, API ¼ wave retarder partially over PRXF2340 metallized prisms.

The high gray scale values correspond to the region of the sample with the retarder, whereas the low gray scale values correspond to the region of the sample without the retarder. High contrast was observed between the two regions.

Example 4

Sample compose of API QWF over 6360 high-gloss TIR prisms.

In this example retroreflector was mounted on a flat surface and illuminated with circularly polarized light. Then the API QWF retarder was used to partially cover the retroreflector and a photo taken and analyzed. Entrance angle of 5 degrees, observation angle is approximately 1 degree.

Figure 11:
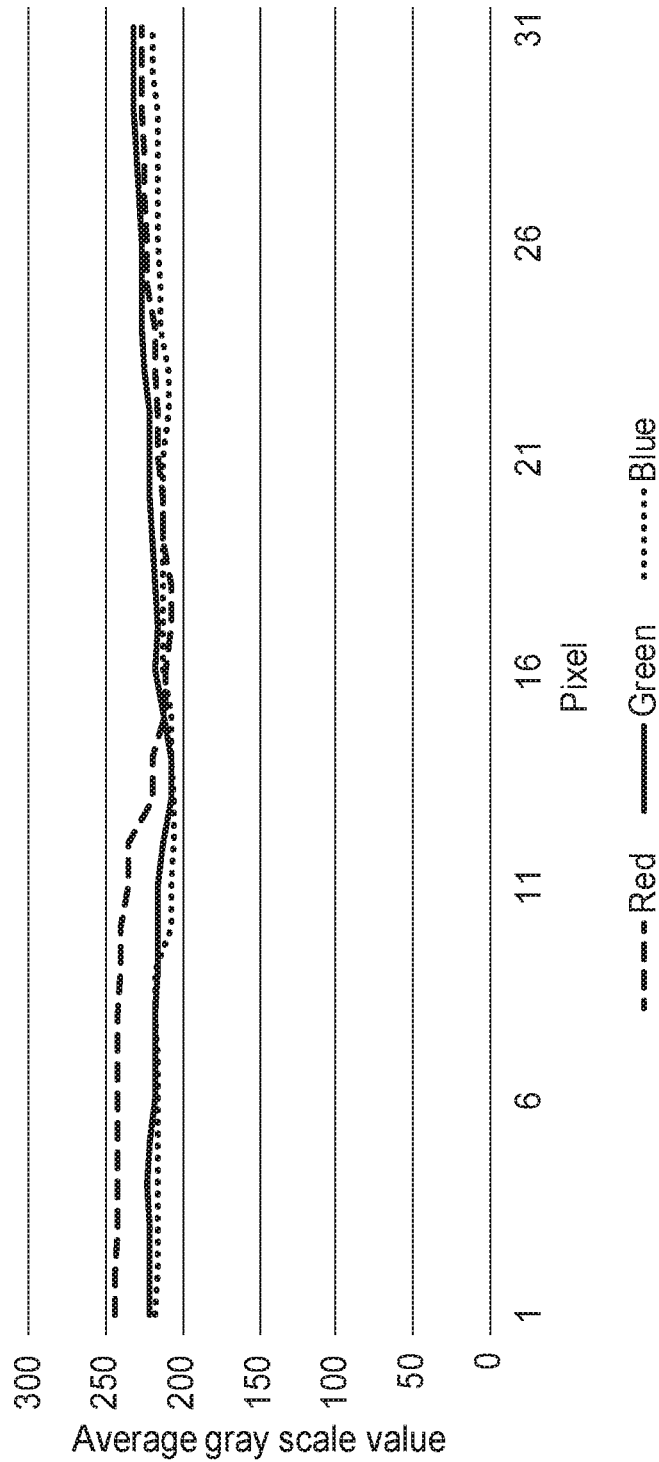
FIG. 11 is a vertical scan of Example 4.

FIG. 11: Example 4, Cross-section 2. Edge of API QWF retarder partially over 6360 high-gloss TIR prisms. Hardly any difference is shown.

The lower pixel numbers below 15 correspond to the region of the sample without the retarder whereas higher than 15 had the retarder overlay. Contrast ratio is nearly 1.

Example 5

Sample composed of API QWF over Scotchlite 8830

In this example retroreflector was mounted on a flat surface and illuminated with circularly polarized light. Then the API retarder was used to partially cover the retroreflector and a photo taken and analyzed. Entrance angle of 5 degrees, observation angle is approximately 1 degree.

Figure 12:
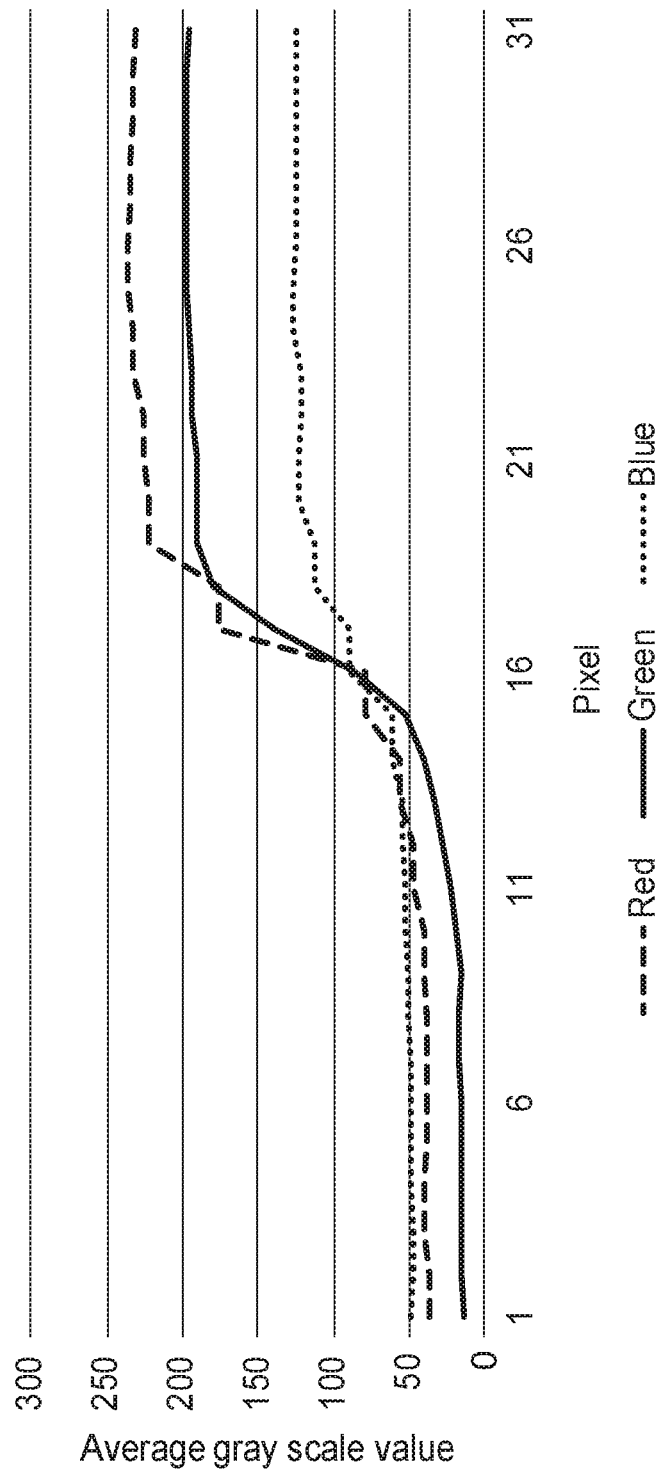
FIG. 12 is a vertical scan of Example 5.

FIG. 12: Example 5, Cross-section 3. Edge of API over Scotchlite 8830.

The high gray scale values correspond to the region of the sample with the retarder, whereas the low gray scale values correspond to the region of the sample without the retarder. A high contrast ratio is observed.

Example 6

Sample composed of API QWF over 8965 Scotchlite

In this example retroreflector was mounted on a flat surface and illuminated with circularly polarized light. Then the API QWF retarder was used to partially cover the retroreflectors and a photo taken and analyzed. Entrance angle of 5 degrees, observation angle is approximately 1 degree.

Figure 13:
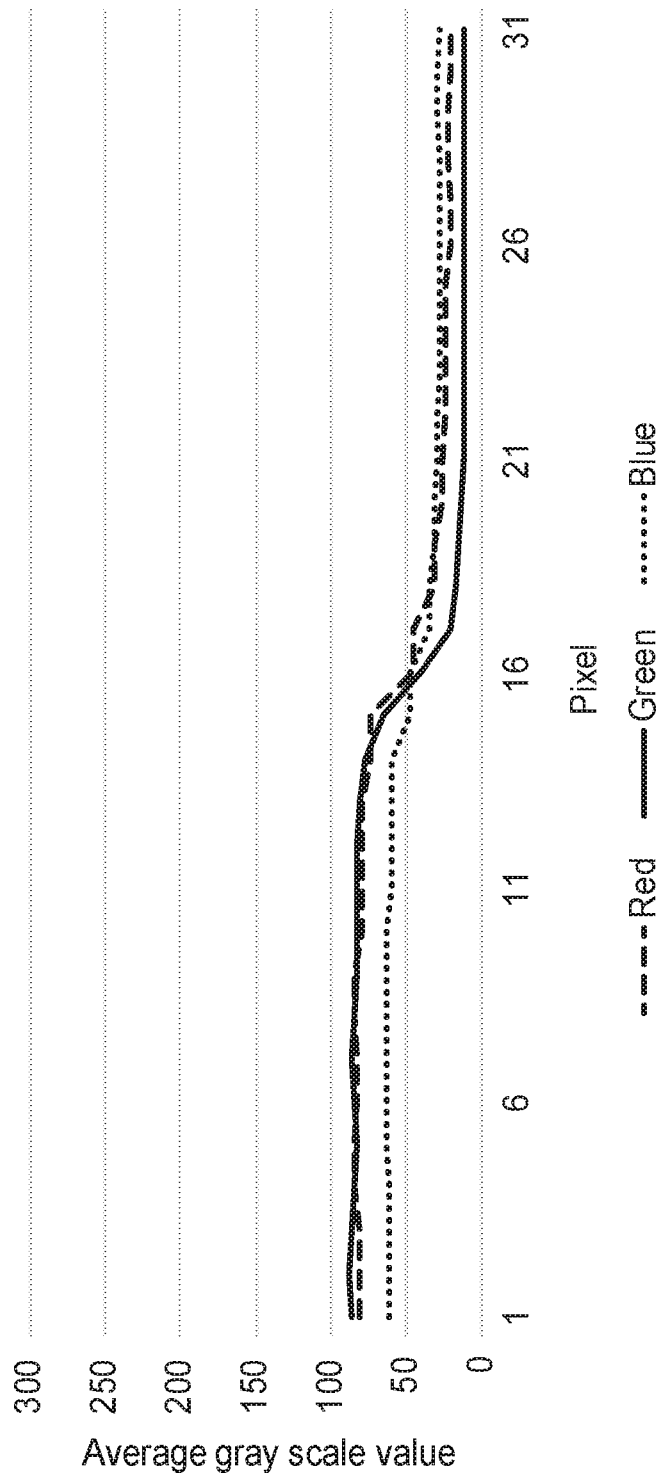
FIG. 13 is a vertical scan of Example 6.

FIG. 13: Example 6, Cross-section 4. Edge of API over 8965 Scotchlite. The high gray scale values correspond to the region of the sample with the retarder, whereas the low gray scale values correspond to the region of the sample without the retarder.

Example 7

Sample composed of API QWF over Scotchlite 8887

In this example retroreflector was mounted on a flat surface and illuminated with circularly polarized light. Then the API QWF retarder was used to partially cover the retroreflectors and a photo taken and analyzed. Entrance angle of 5 degrees, observation angle is approximately 1 degree.

Figure 14:
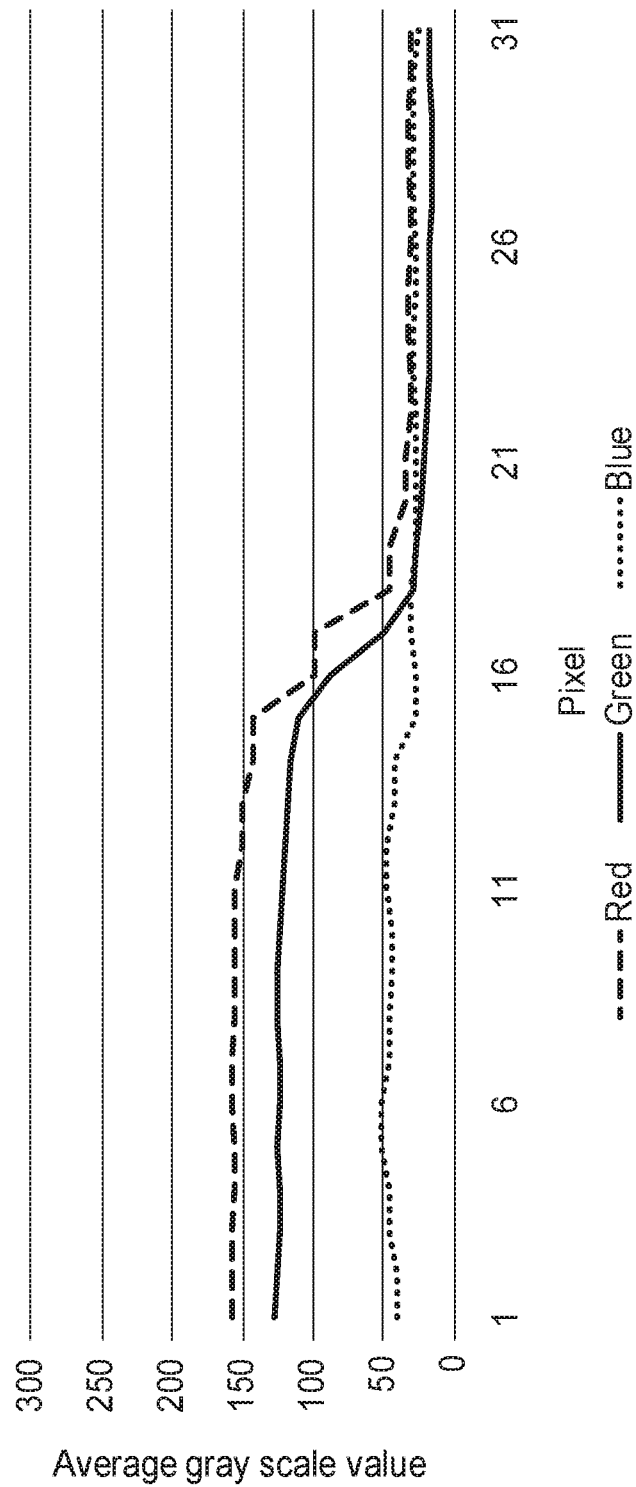
FIG. 14 is a vertical scan of Example 7.

FIG. 14: Example 7. Cross-section 5. API Partially over 8887 Scotchlite.

The high gray scale values correspond to the region of the sample with the retarder, whereas the low gray scale values correspond to the region of the sample without the retarder. Measurement Results Examples 3-7:

For examples 3-7 the highest contrast channel (Red, Green or Blue) was chosen for each sample and reported in the table below and the contrast ratio of with/without the retarder present was estimated. Note the metal backed retroreflectors had by far the highest contrast.

TABLE 6

Contrast comparison Examples 3-7

| Example | Max Contrast |
|---|---|
| 3 | 31 |
| 4 | 1 |
| 5 | 25 |
| 6 | 10 |
| 7 | 12 |

Example 8

Sample is composed of API QWF retarder on Scothchlite 8830 retro-reflector. This is an observation of the angular sensitivity for three conditions:

Horizontal retarder at 5 degree entrance angle
Vertical retarder at 5 degree entrance angle
Vertical retarder at 41 deg entrance angle The API showed no evidence of fringing at any in-plane rotation.

Figure 15:
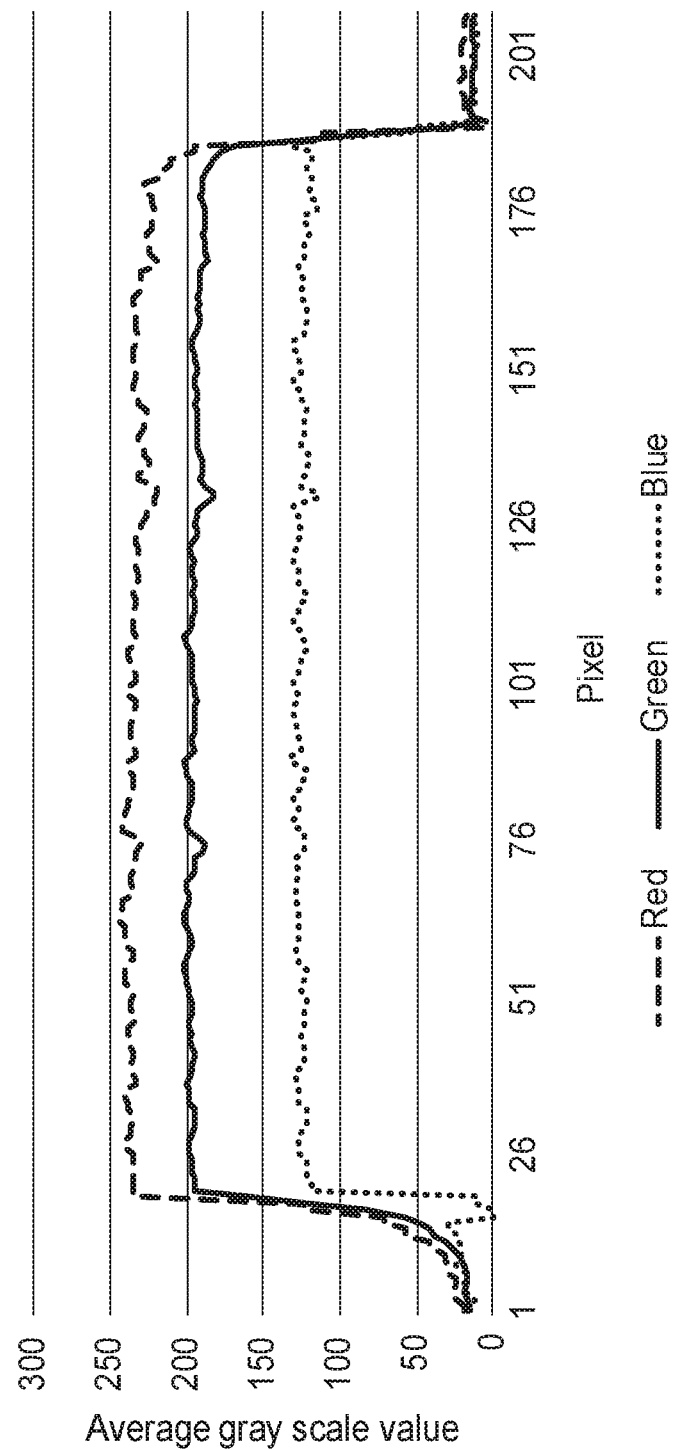
FIG. 15 is a horizontal scan of Example 8.

FIG. 15: Example 8 Horizontal, Cross-section. API QWF over Scotchlite 8830. Small variation of all the signals leads to good color uniformity.

Figure 16:
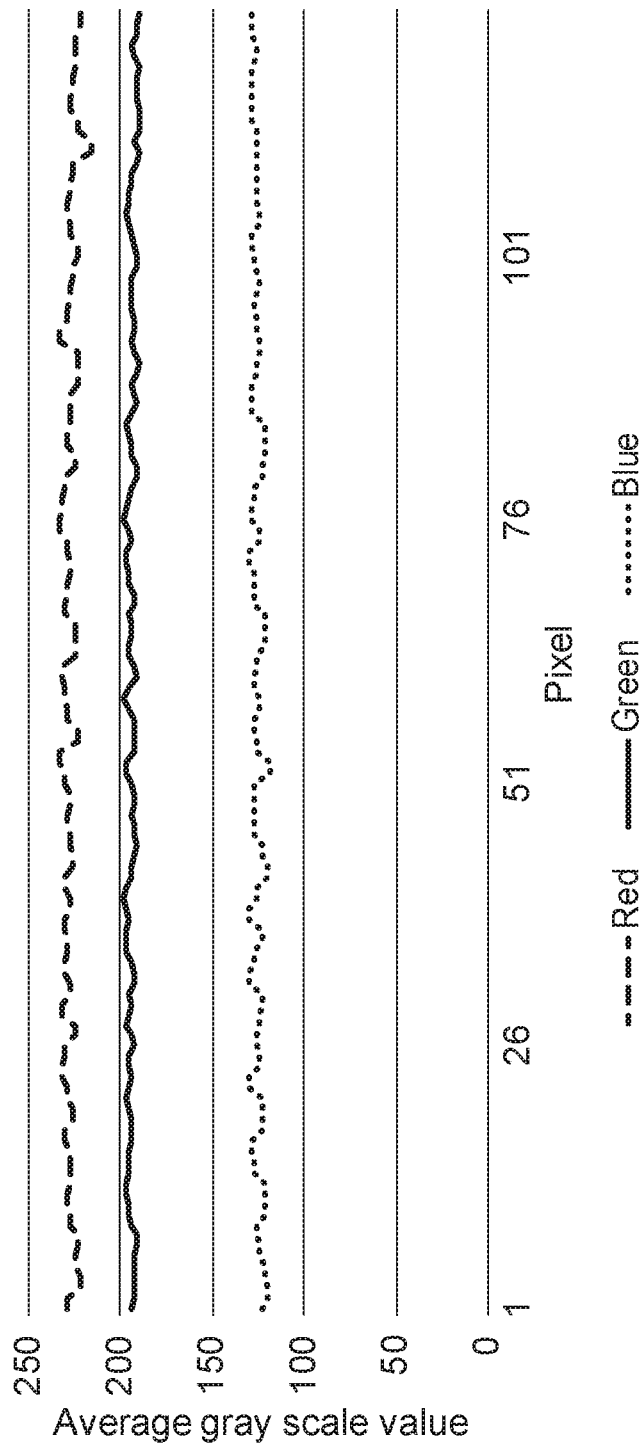
FIG. 16 is a vertical scan of Example 8.

FIG. 16: Example 8, Vertical cross-section 2. API over Scotchlite 8830. Note the good relative color uniformity over the cross-section.

Figure 17:
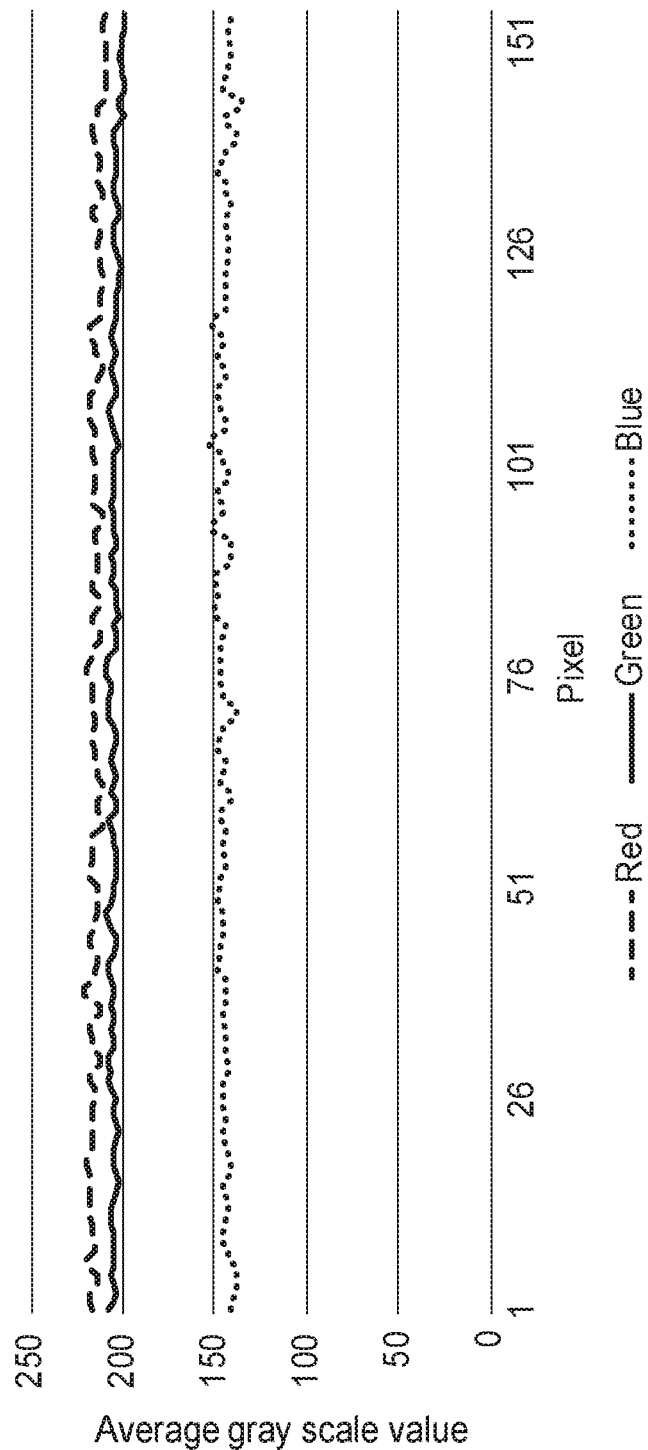
FIG. 17 is a vertical scan of Example 8.

FIG. 17: Example 8, vertical and 41 degree entrance angle. API over Scotchlite 8830. Note the relative color uniformity over the cross-section.

Example 9

Sample composed of LCPET retarder overlaying Scotchlite 8830 at

Horizontal at 5 degree entrance angle
Vertical at 5 degree entrance angle
Vertical at 41 deg entrance angle The PET showed fringing at all in plane rotations.

Figure 18:
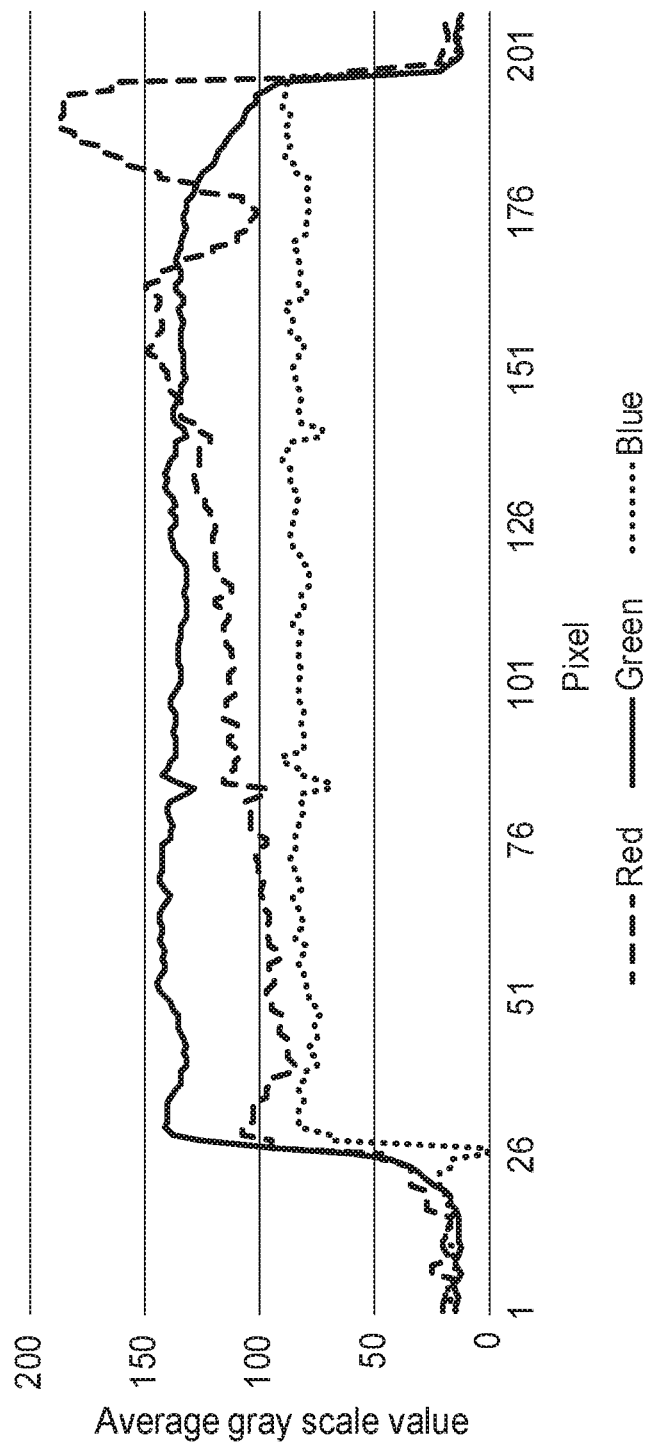
FIG. 18 is a horizontal scan of Example 9.

FIG. 18: Example 9, Horizontal. LCPET over Scotchlite 8830. Note the variation in the red signal leading to color non-uniformity.

Figure 19:
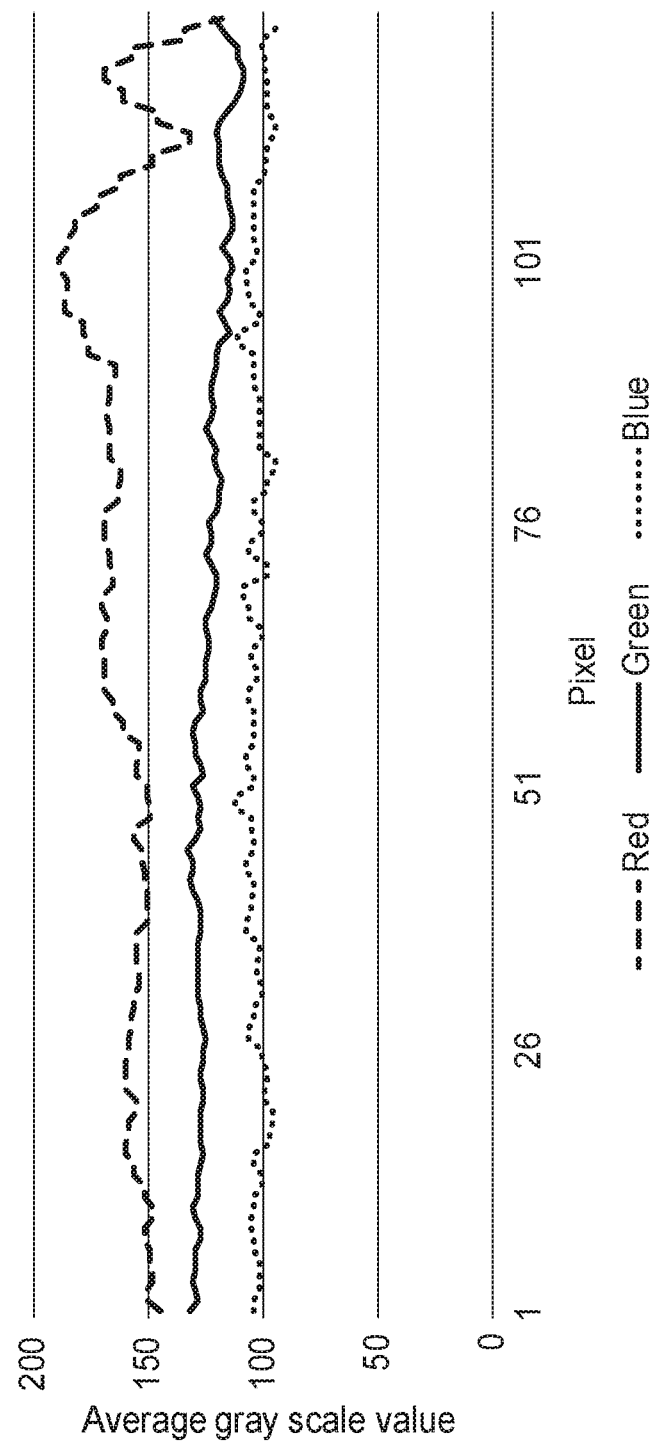
FIG. 19 is a vertical scan of Example 9.

FIG. 19: Example 9, Vertical. LCPET over Scotchlite 8830. Note the poor color uniformity especially at the higher pixel locations.

Figure 20:
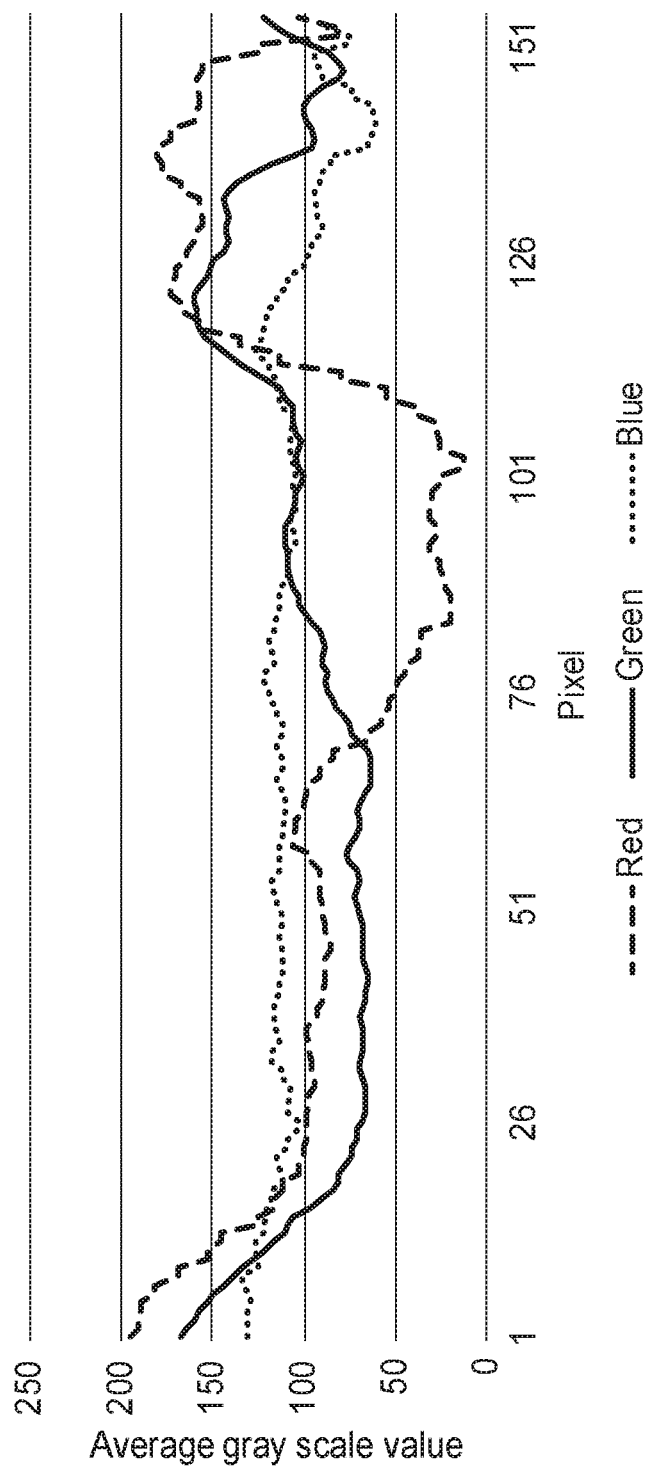
FIG. 20 is a vertical scan of Example 9.

FIG. 20: Example 9, Vertical with 41 deg entrance angle. LCPET over Scotchlite 8830. Note the very poor color uniformity over the cross-section.

Example 10

Sample composed of LCA1 overlaying Scotchlite 8830. Entrance angle is 5 deg, the observation angle is 1 deg. Without a retarder the 8830 was dark. With the ¼ wave retarder the retroreflector was bright and colorless.

Figure 21:
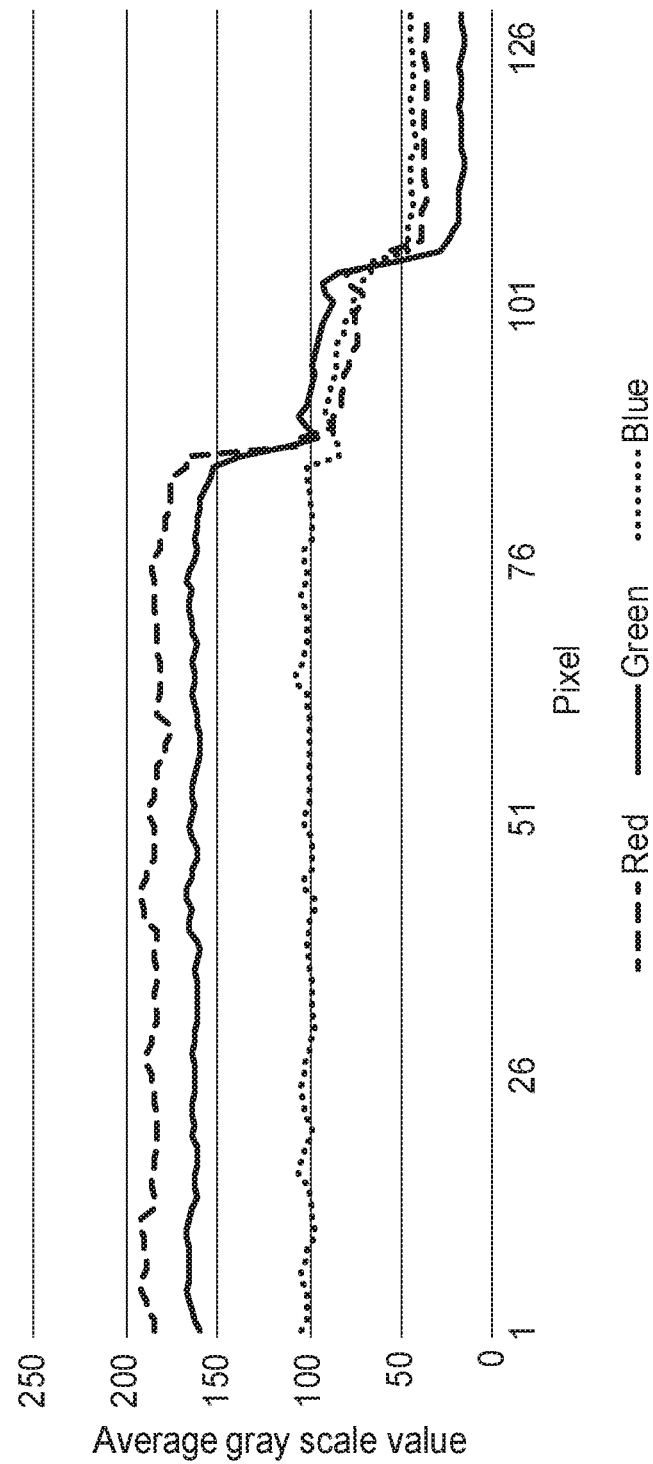
FIG. 21 is a vertical scan of Example 10.

FIG. 21: Example 10. LCA1 retarder over Scotchlite 8830. Note the relative color uniformity over the sample from pixels 1 to 90. There is no coating from 90 to 105.

Example 11

Sample composed of LCA2 retarder on retroreflector Scotchlite 8830. Entrance angle is 5 deg, the observation angle is 1 deg. Without a retarder the 8830 was dark.

Figure 22:
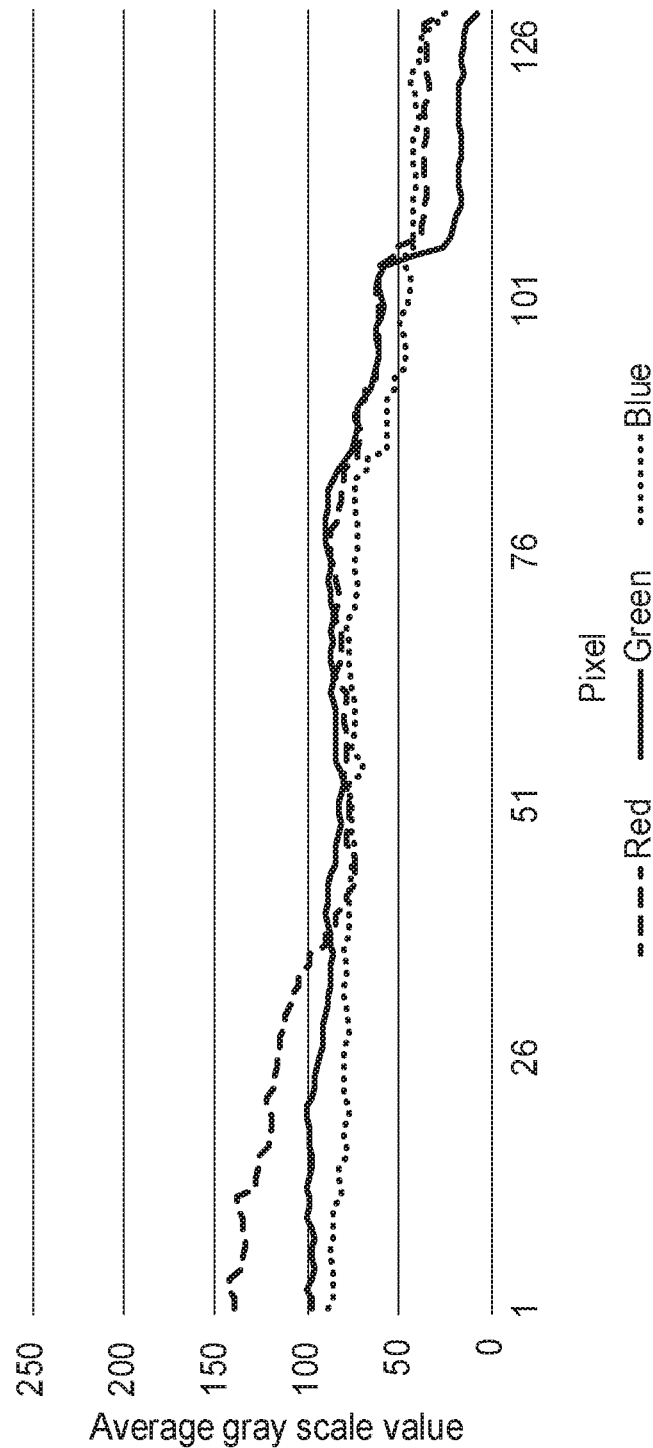
FIG. 22 is a vertical scan of Example 11.

FIG. 22: Example 11. LCA2 retarder over Scotchlite 8830. Note the color non-uniformity over the sample from pixels 1 to 80. There is no coating from 80 to 105 pixel location.

Example 12

Sample is composed of LCA1 retarder overlaying Scotchlite 8830 retroreflector.

The retarder/retro-reflector combination was viewed at a range of entrance angles with the observed result of bright white received image and no color fringing. This example is angularly invariant.

5, 30, 60 degree out of plane rotation
90 degree in plane (Vertically oriented)

Figure 23:
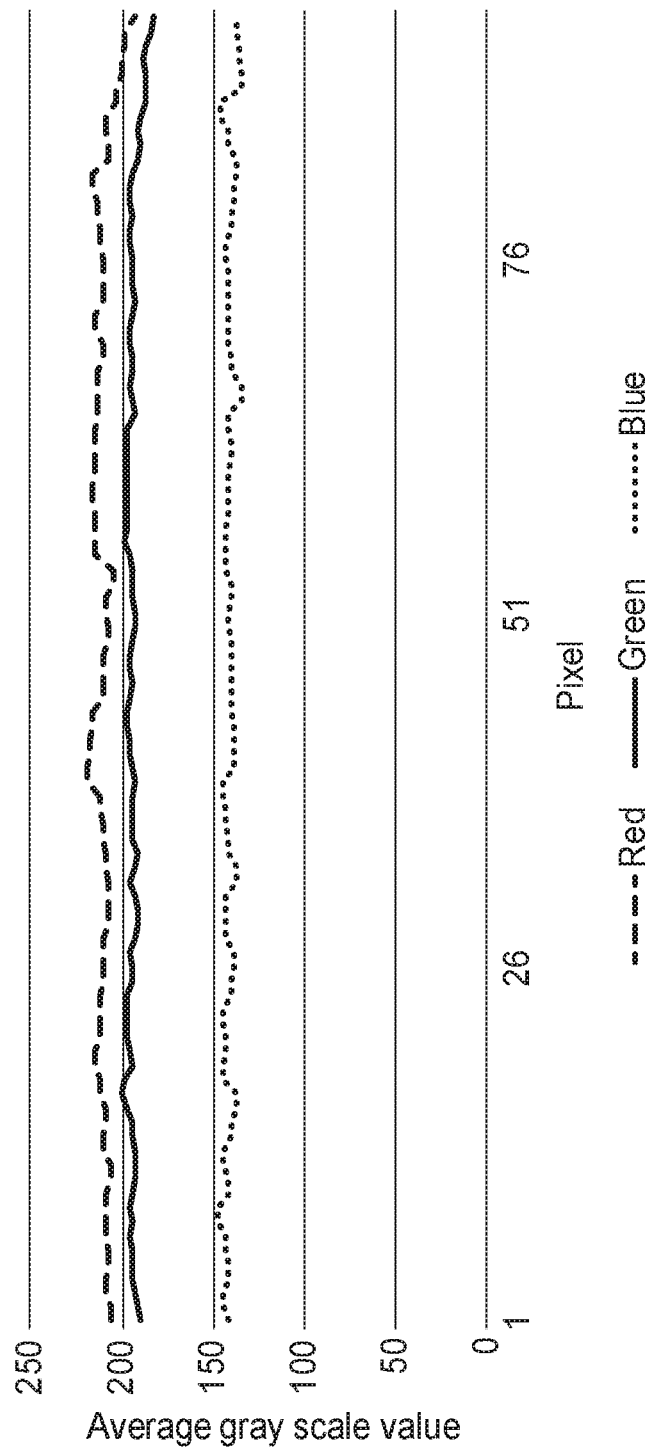
FIG. 23 is a vertical scan of Example 12.

FIG. 23: Example 12, Vertical cross-section 2. QWLC on acrylic over Scotchlite 8830. 5° entrance angle.

Figure 24:
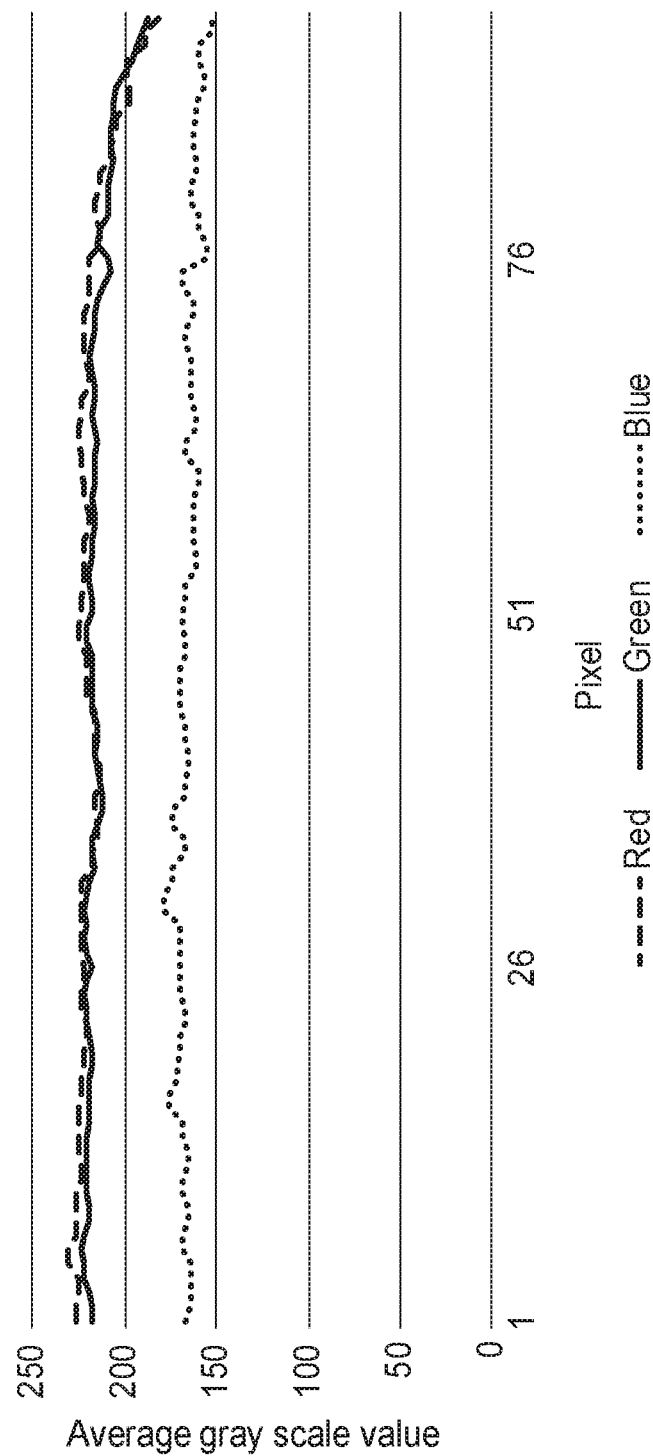
FIG. 24 is a vertical scan of Example 12.

FIG. 24: Example 12, Vertical cross-section 2. LCA1 over Scotchlite 8830. 30° entrance angle.

Figure 25:
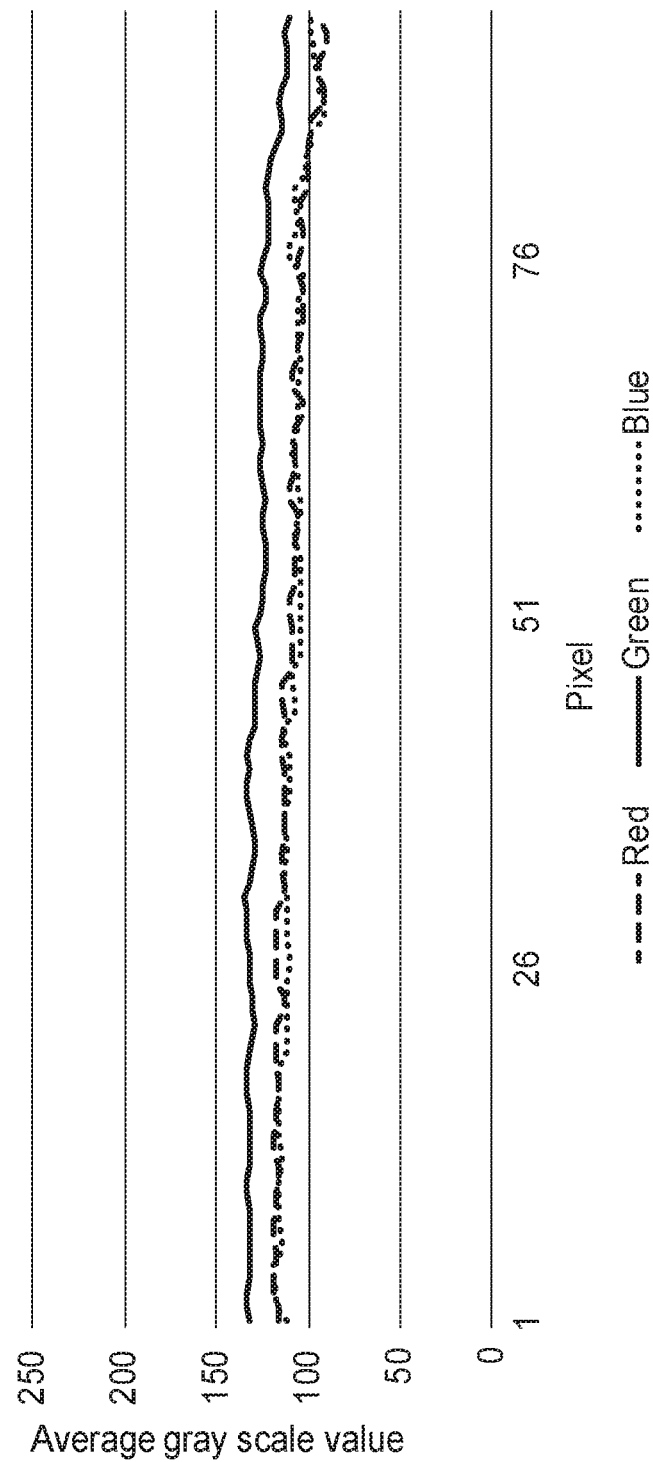
FIG. 25 is a vertical scan of Example 12.

FIG. 25: Example 12, Vertical cross-section 2. QWLC on acrylic over Scotchlite 8830. 60° entrance angle.

Example 13

Sample composed of LCPET on Scotchlite 8830 retroreflector.

We observe extreme fringing and a high degree of angular sensitivity

Figure 26:
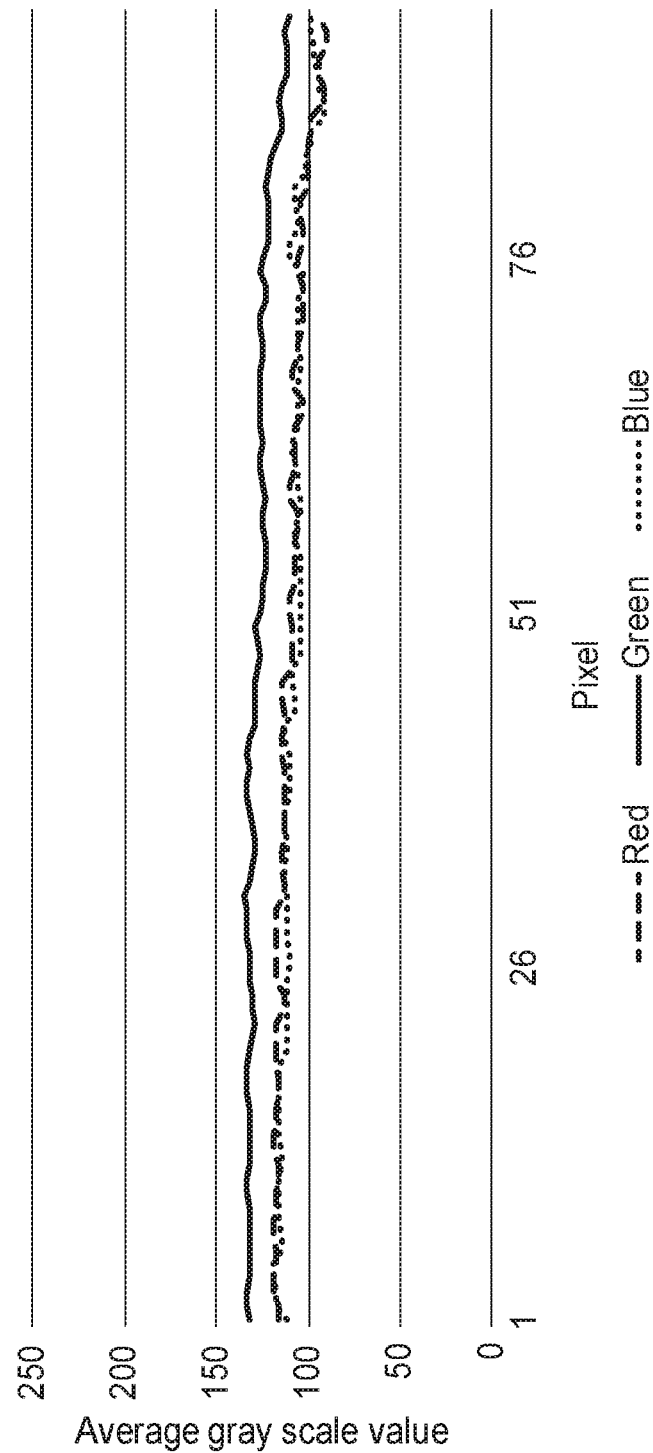
FIG. 26 is a vertical scan of Example 13.

FIG. 26: Example 13, Vertical cross-section 1. LCPET over Scotchlite 8830.5° entrance angle.

Figure 27:
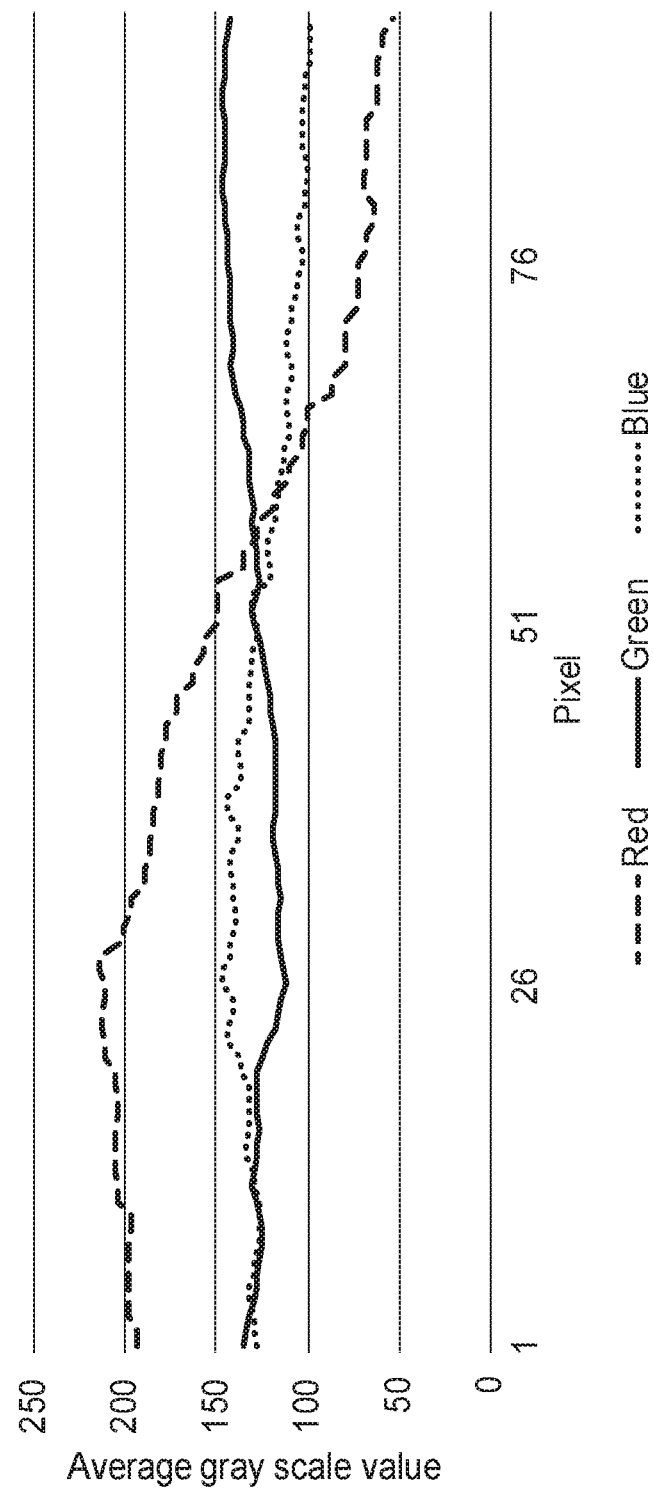
FIG. 27 is a vertical scan of Example 13.

FIG. 27: Example 13. LCPET over Scotchlite 8830.30° entrance angle. At this entrance angle the color is very sensitive.

Figure 28:
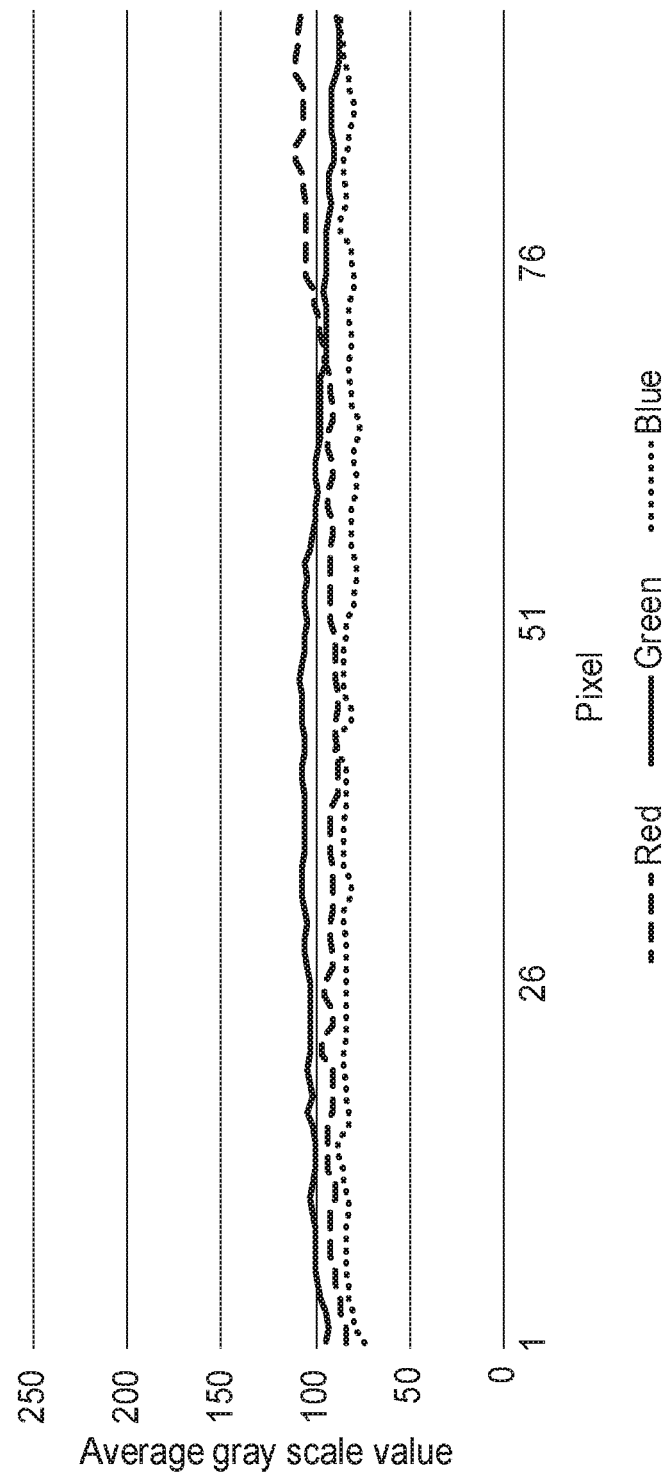
FIG. 28 is a vertical scan of Example 13.

FIG. 28: Example 13. LCPET over Scotchlite 8830.60° entrance angle. The color has again changed compared to the previous entrance angles and the color shifts over the face of the retarder.

Example 14

Sample composed of API QWF on 3M Scotchlite 8830 with target response measured with linearly polarized light. Linear polarizer (on light source) and Analyzer (linear polarizer on camera) were aligned.

The API QWF was rotated in the plane of the film to approximately 0°, 45°, and 90° with respect to horizontal. The target was also tilted out of plane about a vertical axis to 5°, 30°, and 60°.

Large changes is brightness and in some cases color were observed from bright white to deep purple at different viewing conditions. This contrasts to earlier examples with API QWF and 8830 viewed with circularly polarized light where angularly invariance was observed. Observations are documented in the table below.

TABLE 7

| | | Visual observations | | |
| --- | --- | --- | --- | --- |
| | | Retarder angle | | |
| | | 0 | 45 | 90 |
| Entrance | 5 | Bright | Dark Purple | Bright |
| Angle | 30 | Bright | Dark Purple | Bright |
| | 60 | Dark Green | Dark Purple | Dark Green |

Example 15

Sample composed of API QWF on 3M Scotchlite 8830 and analyzed with linearly polarized light. Linear polarizer (on light source) and Analyzer (linear polarizer on camera) for this instance were crossed.

The API QWF was rotated in the plane of the film to approximately 0°, 45°, and 90° with respect to horizontal. The target was also tilted out of plane about a vertical axis to 5°, 30°, and 60°.

Large changes is brightness and in some cases color were observed from bright white to deep purple at different viewing conditions. This contrasts to earlier examples with API and 8830 viewed with circularly polarized light where angularly invariance was observed. Observations are documented in the table below.

TABLE 8

| | | more visual observations | | |
| --- | --- | --- | --- | --- |
| | | Retarder angle | | |
| | | 0 | 45 | 90 |
| Entrance | 5 | Black | Bright | Black |
| Angle | 30 | Black | Bright | No data |
| | 60 | Black | Dark Yellow | No data |

What is claimed is:

1. A retroreflecting article having a light incidence surface, comprising:
    a retroreflecting layer; and
    a retardation layer disposed nearer to the light incidence surface than the retroreflecting layer, the retardation layer including a compensation film having a retardance of less than 100 nm;
    wherein the retardation layer includes a quarter wave retarder for at least one wavelength in the near infrared range;
    wherein the retroreflecting layer is non-depolarizing; and
    wherein the retardation layer is rotationally invariant.

2. The retroreflecting article of claim 1, wherein the retroreflecting layer is a metal-backed prismatic retroreflector.

3. The retroreflecting article of claim 1, wherein the retroreflecting layer is a metal-backed beaded retroreflector.

4. The retroreflecting article of claim 1, wherein the retroreflecting layer includes beads partially submerged in a binder.

5. The retroreflecting article of claim 1, wherein the retroreflecting layer is dielectric-coated beaded retroreflector.

6. The retroreflecting article of claim 1, wherein the retardation layer is a liquid crystal retardation layer.

7. The retroreflecting article of claim 1, wherein the retardation layer is a patterned retardation layer including at least first and second regions, and wherein the first region of the patterned retardation layer is a quarter wave retarder for at least one wavelength in the near infrared range, but the second region of the patterned retardation layer for the at least one wavelength in the near infrared range, has substantially zero retardance or absorbs the at least one wavelength in the near infrared range.

8. The retroreflecting article of claim 7, wherein circularly polarized light of the at least one wavelength incident on the light incidence surface corresponding to the first region at a range of incidence angles is retroreflected at least 80% as circularly polarized light having a same handedness.

9. The retroreflecting article of claim 8, wherein the range of incidence angles includes at least a 30 degree cone.

10. The retroreflecting article of claim 8, wherein the range of incidence angles includes at least a 45 degree cone.

11. The retroreflecting article of claim 8, wherein the range of incidence angles includes at least a 60 degree cone.

12. The retroreflecting article of claim 1, wherein the retardation layer is one of a liquid crystal retardation layer and a polycarbonate retardation layer.

13. The retroreflecting article of claim 1, wherein the retardation layer includes a quarter wave retarder for a range of wavelengths, the range of wavelengths being at least 100 nm wide.

14. The retroreflecting article of claim 13, wherein the range of wavelengths includes at least some visible wavelengths.

15. The retroreflecting article of claim 13, wherein the range of wavelengths includes the entire near infrared range.

16. The retroreflecting article of claim 13, wherein the range of wavelengths includes all visible wavelengths.

17. The retroreflecting article of claim 1, further comprising an attenuation layer between the light incidence surface and the non-depolarizing retroreflecting layer, wherein the attenuation layer partially absorbs the light of the at least one wavelength.

18. The retroreflecting article of claim 1, further including a camouflage layer, wherein the camouflage layer substantially absorbs visible wavelengths but substantially transmits near infrared wavelengths.

19. The retroreflecting article of claim 1, wherein at least part of the retardation layer is not a quarter wave retarder for a second wavelength within the near infrared or visible range.

20. The retroreflecting article of claim 1, wherein at least part of the retardation layer completely absorbs light of a second wavelength within the near infrared or visible range.

21. A retroreflecting article having a light incidence surface, comprising:
    a retroreflecting layer; and
    a retardation layer disposed nearer to the light incidence surface than the retroreflecting layer, the retardation layer including a liquid crystal retarder;
    wherein the retardation layer includes a quarter wave retarder for at least one wavelength in the near infrared range;
    wherein the retroreflecting layer is non-depolarizing; and
    wherein the retardation layer is rotationally invariant, wherein the retardation layer is a patterned retardation layer including at least first and second regions, and wherein the first region of the patterned retardation layer is a quarter wave retarder for at least one wavelength in the near infrared range, but the second region of the patterned retardation layer for the at least one wavelength in the near infrared range, has substantially zero retardance or absorbs the at least one wavelength in the near infrared range.

22. A retroreflecting article having a light incidence surface, comprising:
- a retroreflecting layer; and
- a retardation layer disposed nearer to the light incidence surface than the retroreflecting layer, the retardation layer including an oriented birefringent polymer film;
- wherein the retardation layer includes a quarter wave retarder for at least one wavelength in the near infrared range;
- wherein the retroreflecting layer is non-depolarizing; and
- wherein the retardation layer is rotationally invariant, wherein the retardation layer is a patterned retardation layer including at least first and second regions, and wherein the first region of the patterned retardation layer is a quarter wave retarder for at least one wavelength in the near infrared range, but the second region of the patterned retardation layer for the at least one wavelength in the near infrared range, has substantially zero retardance or absorbs the at least one wavelength in the near infrared range.

* * * * *